US012502103B2

(12) United States Patent
Parker et al.

(10) Patent No.: US 12,502,103 B2
(45) Date of Patent: Dec. 23, 2025

(54) SYSTEMS FOR DETERMINING SIMILARITY OF SEQUENCES OF GLUCOSE VALUES

(71) Applicant: Dexcom, Inc., San Diego, CA (US)

(72) Inventors: Andrew Parker, San Diego, CA (US); Mark Derdzinski, San Diego, CA (US); Lauren Jepson, San Diego, CA (US); Nathaniel Heintzman, San Diego, CA (US); Jacob Leach, San Diego, CA (US)

(73) Assignee: Dexcom, Inc., San Diego, CA (US)

( * ) Notice: Subject to any disclaimer, the term of this patent is extended or adjusted under 35 U.S.C. 154(b) by 866 days.

(21) Appl. No.: 17/746,475

(22) Filed: May 17, 2022

(65) Prior Publication Data

US 2022/0361779 A1 Nov. 17, 2022

Related U.S. Application Data

(60) Provisional application No. 63/189,469, filed on May 17, 2021.

(51) Int. Cl.
*A61B 5/145* (2006.01)
*A61B 5/00* (2006.01)

(52) U.S. Cl.
CPC ........ *A61B 5/14532* (2013.01); *A61B 5/7282* (2013.01); *A61B 5/7475* (2013.01)

(58) Field of Classification Search
CPC . A61B 5/14532; A61B 5/7475; A61B 5/7282; G16H 50/20; G16H 40/63; G16H 50/70
See application file for complete search history.

(56) References Cited

U.S. PATENT DOCUMENTS

| | | | |
|---|---|---|---|
| 2010/0261987 A1* | 10/2010 | Kamath | A61B 5/744 600/365 |
| 2020/0258632 A1* | 8/2020 | Soni | G16H 50/20 |
| 2020/0375549 A1 | 12/2020 | Wexler et al. | |

FOREIGN PATENT DOCUMENTS

| | | |
|---|---|---|
| EP | 1918837 A1 | 5/2008 |
| WO | 2014052921 A2 | 4/2014 |

OTHER PUBLICATIONS

Fan L., "A Survey of Differentially Private Generative Adversarial Networks," 2020, Retrieved from the Internet: https://www.semanticscholar.org/paper/A-Survey-of-Differentially-Private-Generative-Fan/35d58a9d898a857ecce366315f0b44392b0d5abe, 8 pages.

(Continued)

*Primary Examiner* — Eric F Winakur
*Assistant Examiner* — Sienna C Pyle
(74) *Attorney, Agent, or Firm* — Patterson + Sheridan, LLP

(57) ABSTRACT

In implementations of systems for determining a similarity of sequences of glucose values, a computing device implements a similarity system to receive input data describing a sequence of user glucose values measured by a continuous glucose monitoring (CGM) system. The similarity system computes similarity scores for a plurality of sequences of glucose values by comparing each glucose values included in the sequence of user glucose values with ever glucose value included in each sequence of the plurality of sequences. A particular sequence of glucose values that is associated with a highest similarity score is identified. The similarity system determines an externality associated with the particular sequence. The similarity system generates an indication of the externality for display in a user interface.

18 Claims, 12 Drawing Sheets

(56) References Cited

OTHER PUBLICATIONS

Xie L., et al., "Differentially Private Generative Adversarial Network," Feb. 19, 2018, Retrieved from the Internet: https://arxiv.org/abs/1802.06739, 9 pages.
International Search Report and Written Opinion for Application No. PCT/US2022/029648, mailed Aug. 19, 2022, 14 pages.

* cited by examiner

SYSTEMS FOR DETERMINING SIMILARITY OF SEQUENCES OF GLUCOSE VALUES

RELATED APPLICATION

This application claims the benefit of U.S. Provisional Patent Application No. 63/189,469, filed May 17, 2021, and titled "Systems for Determining Similarity of Sequences of Glucose Values," the entire disclosure of which is hereby incorporated by reference.

BACKGROUND

Diabetes is a metabolic condition affecting hundreds of millions of people. For these people, monitoring blood glucose levels and regulating those levels to be within an acceptable range is important not only to mitigate long-term issues such as heart disease and vision loss, but also to avoid the effects of hyperglycemia and hypoglycemia. Maintaining blood glucose levels within an acceptable range can be challenging, as this level is almost constantly changing over time and in response to everyday events, such as eating or exercising.

Advances in medical technologies have facilitated development of various systems for monitoring blood glucose, including continuous glucose monitoring (CGM) systems, which measure and record glucose concentrations in substantially real-time. Users of these CGM systems are able to monitor their current blood glucose levels and also review their historic blood glucose levels such as to compare yesterday's blood glucose levels with today's blood glucose levels. The ability to view archived historic blood glucose levels allows users of the CGM systems to identify potential improvements to individual regimes for maintaining healthy blood glucose levels.

In one example, users of these CGM systems rely on aggregate data metrics calculated from their historic blood glucose levels as part of their diabetes management. For example, a user of a CGM system compares today's time in range (TIR) with the user's average TIR over the past month as one way of determining whether the user should do something differently to increase today's TIR. In another example, the user compares today's TIR with the user's average TIR to determine whether something the user did differently today was effective to increase today's TIR relative to the user's average TIR.

While use of aggregate CGM data metrics such as an average TIR provides clinically useful information, the aggregation of CGM data fails to capture or utilize information included in a sequential property of the data. For example, raw CGM data describes a timeseries of glucose values and aggregating the raw data to compute an average glucose value effectively treats each glucose value included in the timeseries as an independent observation. This inability to utilize information included in the sequential property of the CGM data is a limitation of conventional CGM systems.

SUMMARY

In order to overcome the limitations of conventional systems, techniques and systems are described for determining similarity of sequences of glucose values. In one example, input data is received describing a sequence of user glucose values measured by a continuous glucose monitoring (CGM) system. Similarity scores are computed for a plurality of sequences of glucose values by comparing each glucose value included in the sequence of user glucose values with every glucose value included in each sequence of the plurality of sequences. For example, a similarity model is accessed or generated. The similarity model leverages a discrete random variable (e.g., a glucose variable) and builds a categorical distribution of the discrete random variable based on observations from a corpus of glucose measurements. For example, the corpus includes millions of days of glucose measurements and these glucose measurements are representative of many types of normal conditions as well as various of abnormal conditions.

The similarity model is implemented to compute a probability of observing a particular glucose value given evidence or context data based on the corpus of glucose measurements. In order to compute a similarity score for a specific sequence of glucose values of the plurality of sequences, differences are determined between a probability of observing each user glucose value given evidence or context data and a probability of observing every glucose value included in the specific sequence given the evidence or the context data. The similarity score for the specific sequence is equal to a sum of all of the determined differences.

A particular sequence of glucose values is identified that is associated with a maximum similarity score of the similarity scores. For example, the particular sequence is a most similar sequence to the sequence of user glucose values included the plurality of sequences. An externality is determined that is associated with the particular sequence. In one example, the externality is something known about the particular sequence and which may be inferable for the sequence of user glucose values. In this example, an indication of the externality is generated for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
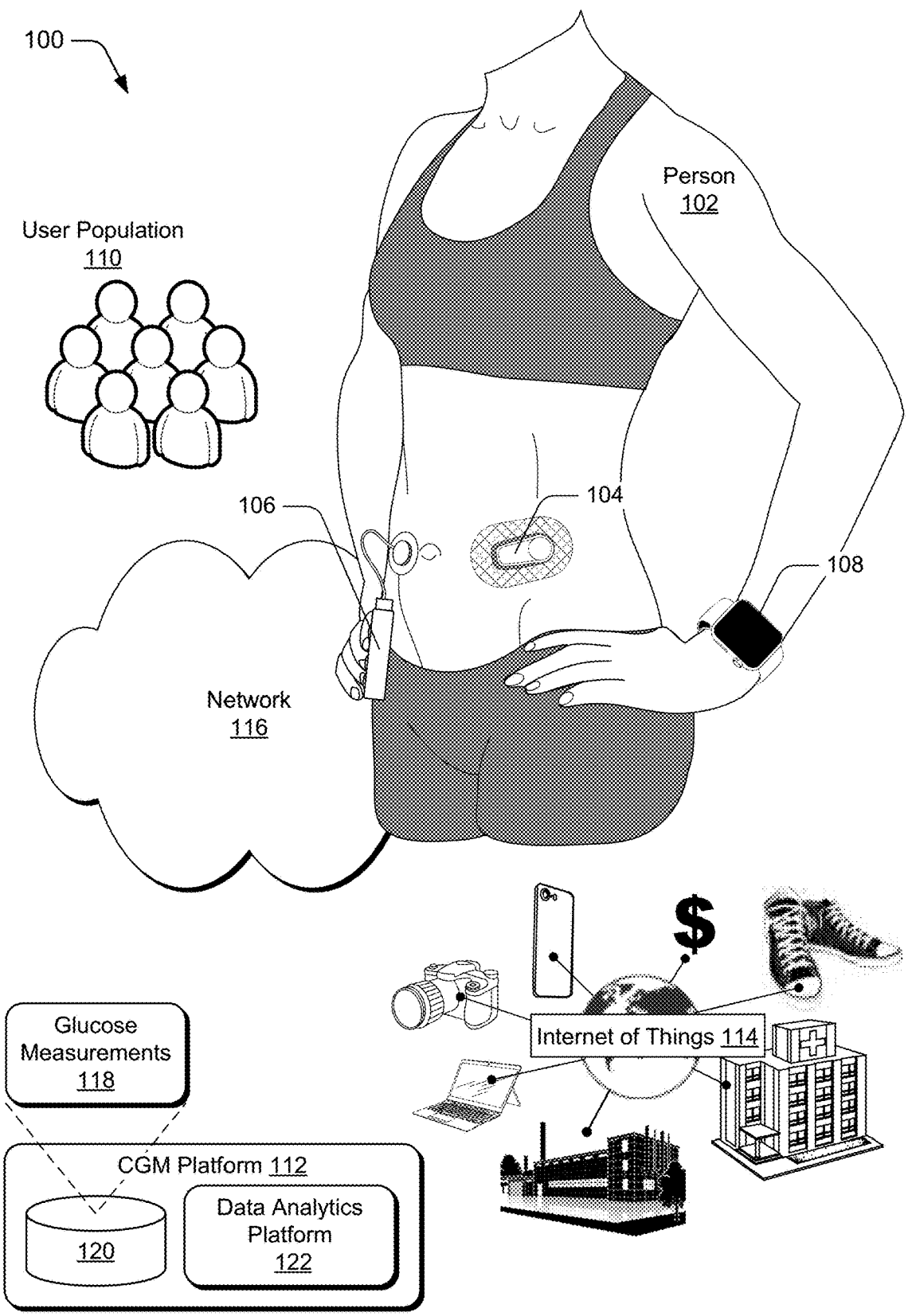
FIG. 1 is an illustration of an environment in an example implementation that is operable to employ techniques described herein.

Conventional continuous glucose monitoring (CGM) systems are limited to determining aggregate metrics from sequences of glucose values such as averages, minimums, maximums, and so forth. This is a limitation of conventional systems because aggregate CGM metrics do not utilize information included in a sequential property of the glucose values. For example, instead of considering a sequence of glucose values as a timeseries in which a subsequent value depends on a previous value, the aggregate metrics treat each glucose value included in the sequence of glucose values as an independent observation. Because of this, no information is reliably inferable about a first sequence from available information about a second sequence even if the first and second sequence have a same aggregate metric value. For instance, the first and second sequence have a same minimum or maximum value but no other values in common. In order to overcome the limitations of conventional systems, techniques and systems are described for determining similarity of sequences of glucose values. In one example, the described systems determine similarity utilizing information included in the sequential property of sequences of glucose values.

Once a sequence of glucose values is determined to be similar to an additional sequence of glucose values, information about the sequence of glucose values is inferable from information about the additional sequence of glucose values. For instance, an intervention which was beneficial during a period of time corresponding to the additional sequence of glucose values may also be beneficial during a period of time corresponding to the sequence of glucose values. For example, a user completed a run to keep the user's blood glucose levels within an acceptable range during the period of time corresponding to the additional sequence of glucose values. In this example, completing a similar run may help to keep the user's blood glucose levels within the acceptable range during the period of time corresponding to the sequence of glucose values.

Similarly, an intervention which was not beneficial during the period of time corresponding to the additional sequence of glucose values may not be beneficial during the period of time corresponding to the sequence of glucose values. In one example, a user completed a run but failed to keep the user's blood glucose levels within an acceptable range during the period of time corresponding to the additional sequence of glucose values. For example, completing a similar run may not be sufficient to keep the user's blood glucose levels within the acceptable range during the period of time corresponding to the sequence of glucose values.

To determine similarity of sequences of glucose values in an example, input data is received describing a sequence of user glucose values measured by a CGM system. In this example, a similarity model is implemented to compute similarity scores between the sequence of user glucose values and additional or historic sequences of glucose values. The similarity scores are computed based on differences between probabilities of observing input glucose values included in the sequence of user glucose values given evidence or context data and probabilities of observing historic glucose values included in the historic sequences of glucose values given the evidence or context data. For instance, the evidence or the context data describes glucose values before and/or after the input glucose values and the historic glucose values in sequential order.

In an example, a particular sequence of historic glucose values is identified that is associated with a highest similarity score of the similarity scores. In this example, information about the sequence of user glucose values is inferable from information that is available about the particular historic sequence due to the similarity of the two sequences. For instance, an externality is determined that is associated with the particular historic sequence. The externality is something known about the particular historic sequence and which may be inferable for the sequence of user glucose values such as an intervention which was beneficial during a period of time corresponding to the historic sequence. An indication of the externality is generated for display in a user interface, for example, to inform a user about the beneficial intervention. This functionality is not possible using conventional systems which are limited to determining aggregate metrics from sequences of glucose values.

Since the described systems are capable of determining similarity of sequences of glucose values, these systems facilitate implementation of a variety of additional functionality which is also not possible using conventional systems. For example, the described systems are usable for automated diabetes coaching, automated technical support, automated linking of events which correspond to similar sequences of glucose values, and so forth. Consider an example in which a user interacts with a user interface of a computing device to search for a sequence of the user's glucose values that is similar to an input sequence of the user's glucose values. A historic sequence of the user's glucose values is identified as having a highest similarity score for the input sequence of the user's glucose values, and an indication of the historic sequence is displayed in the user interface. For instance, the indication includes information about the historic sequence that is inferable about the input sequence of the user's glucose values to support the user's maintenance of healthy blood glucose levels.

In the following description, an example environment is first described that is configured to employ the techniques described herein. Example implementation details and procedures are then described which may be performed in the example environment as well as other environments. Performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes person 102, who is depicted wearing a continuous glucose monitoring (CGM) system 104, insulin delivery system 106, and computing device 108. The illustrated environment 100 also includes other users in a user population 110 of the CGM system, CGM platform 112, and Internet of Things 114 (IoT 114). The CGM system 104, insulin delivery system 106, computing device 108, user population 110, CGM platform 112, and IoT 114 are communicatively coupled, including via a network 116.

Alternatively or additionally, one or more of the CGM system 104, the insulin delivery system 106, or the computing device 108 are communicatively coupled in other ways, such as using one or more wireless communication protocols and/or techniques. By way of example, the CGM system 104, the insulin delivery system 106, and the computing device 108 are configured to communicate with one another using one or more of Bluetooth (e.g., Bluetooth Low Energy links), near-field communication (NFC), 5G, and so forth. In some examples, the CGM system 104, the insulin delivery system 106 and/or the computing device 108 are capable of radio frequency (RF) communications and include an RF transmitter and an RF receiver. In these examples, one or more RFIDs are usable for identification and/or tracking of the CGM system 104, the insulin delivery system 106, or the computing device 108 within the environment 100. For example, the CGM system 104, the insulin delivery system 106, and the computing device 108 are configured to leverage various types of communication to form a closed-loop system between one another.

In accordance with the described techniques, the CGM system 104 is configured to continuously monitor glucose of the person 102. For example, in some implementations the CGM system 104 is configured with a CGM sensor that continuously detects analytes indicative of the person's 102 glucose and enables generation of glucose measurements. In the illustrated environment 100, these measurements are represented as glucose measurements 118. This functionality and further aspects of the CGM system's 104 configuration are described in further detail below with respect to FIG. 2.

In one or more implementations, the CGM system 104 transmits the glucose measurements 118 to the computing device 108, via one or more of the communication protocols described herein, such as via wireless communication. The CGM system 104 is configured to communicate these measurements in real-time (e.g., as the glucose measurements 118 are produced) using a CGM sensor. Alternatively or additionally, the CGM system 104 is configured to communicate the glucose measurements 118 to the computing device 108 at designated intervals (e.g., every 30 seconds, every minute, every five minutes, every hour, every six hours, every day, and so forth). In some implementations, the CGM system 104 is configured to communicate glucose measurements responsive to a request from the computing device 108 (e.g., a request initiated when the computing device 108 generates glucose measurement predictions for the person 102, a request initiated when displaying a user interface conveying information about the person's 102 glucose measurements, combinations thereof, and so forth). Accordingly, the computing device 108 is configured to maintain the glucose measurements 118 of the person 102 at least temporarily (e.g., by storing glucose measurements 118 in computer-readable storage media, as described in further detail below with respect to FIG. 12).

Although illustrated as a wearable device (e.g., a smart watch), the computing device 108 is implementable in a variety of configurations without departing from the spirit or scope of the described techniques. By way of example and not limitation, in some implementations the computing device 108 is configured as a different type of mobile device (e.g., a mobile phone or tablet device). In other implementations, the computing device 108 is configured as a dedicated device associated with the CGM platform 112 (e.g., a device supporting functionality to obtain the glucose measurements 118 from the CGM system 104, perform various computations in relation to the glucose measurements 118, display information related to the glucose measurements 118 and the CGM platform 112, communicate the glucose measurements 118 to the CGM platform 112, combinations thereof, and so forth). In contrast to implementations where the computing device 108 is configured as a mobile phone, the computing device 108 excludes functionality otherwise available with mobile phone or wearable configurations when implemented in a dedicated CGM device configuration, such as functionality to make phone calls, capture images, utilize social networking applications, and the like.

In some implementations, the computing device 108 is representative of more than one device. For instance, the computing device 108 is representative of both a wearable device (e.g., a smart watch) and a mobile phone. In such multiple device implementations, different ones of the multiple devices are capable of performing at least some of the same operations, such as receiving the glucose measurements 118 from the CGM system 104, communicating the glucose measurements 118 to the CGM platform 112 via the network 116, displaying information related to the glucose measurements 118, and so forth. Alternatively or additionally, different devices in the multiple device implementations support different capabilities relative to one another, such as capabilities that are limited by computing instructions to specific devices.

In some example implementations where the computing device 108 represents separate devices, (e.g., a smart watch and a mobile phone) one device is configured with various sensors and functionality to measure a variety of physiological markers (e.g., heartrate, breathing, rate of blood flow, and so on) and activities (e.g., steps, elevation changes, and the like) of the person 102. Continuing this example multiple device implementation, another device is not configured with such sensors or functionality, or includes a limited amount of such sensors or functionality. For instance, one of the multiple devices includes capabilities not supported by another one of the multiple devices, such as a camera to capture images of meals useable to predict future glucose levels, an amount of computing resources (e.g., battery life, processing speed, etc.) that enables a device to efficiently perform computations in relation to the glucose measurements 118. Even in scenarios where one of the multiple devices (e.g., a smart phone) is capable of carrying out such computations, computing instructions may limit performance of those computations to one of the multiple devices, so as not to burden multiple devices with redundant computations, and to more efficiently utilize available resources. In this manner, the computing device 108 is representative of a variety of different configurations and representative of different numbers of devices beyond the specific example implementations described herein.

As mentioned above, the computing device 108 communicates the glucose measurements 118 to the CGM platform 112. In the illustrated environment 100, the glucose measurements 118 are depicted as being stored in storage device 120 of the CGM platform 112. The storage device 120 is representative of one or more types of storage (e.g., databases) capable of storing the glucose measurements 118. In this manner, the storage device 120 is configured to store a variety of other data in addition to the glucose measurements 118. For instance, in accordance with one or more implementations, the person 102 represents a user of at least the CGM platform 112 and one or more other services (e.g., services offered by one or more third party service providers). In this manner, the person 102 is able to be associated with personally attributable information (e.g., a username) and may be required, at some time, to provide authentication information (e.g., password, biometric data, telemedicine service information, and so forth) to access the CGM platform 112 using the personally attributable information. The storage device 120 is configured to maintain this personally attributable information, authentication information, and other information pertaining to the person 102 (e.g., demographic information, health care provider information, payment information, prescription information, health indicators, user preferences, account information associated with a wearable device, social network account information, other service provider information, and the like).

The storage device 120 is further configured to maintain data pertaining to other users in the user population 110. As such, the glucose measurements 118 in the storage device 120 are representative of both the glucose measurements from a CGM sensor of the CGM system 104 worn by the person 102 as well as glucose measurements from CGM sensors of CGM systems worn by other persons represented in the user population 110. In a similar manner, the glucose measurements 118 of these other persons of the user population 110 may be communicated by respective devices via the network 116 to the CGM platform 112, such that other persons are associated with respective user profiles in the CGM platform 112.

The data analytics platform 122 represents functionality to process the glucose measurements 118—alone and/or along with other data maintained in the storage device 120. Based on this processing, the CGM platform 112 is configured to provide notifications in relation to the glucose measurement 118 (e.g., alerts, alarms, recommendations, or other information generated based on the processing). For instance, the CGM platform 112 is configured to provide notifications to the person 102, to a medical service provider associated with the person 102, combinations thereof, and so forth. Although depicted as separate from the computing device 108, portions or an entirety of the data analytics platform 122 are alternatively or additionally configured for implementation at the computing device 108. The data analytics platform 122 is further configured to process additional data obtained via the IoT 114.

To supply some of this additional information beyond previous glucose measurements, the IoT 114 is representative of various sources capable of providing data that describes the person 102 and the person's 102 activity as a user of one or more service providers and activity with the real world. By way of example, the IoT 114 includes various devices of the user (e.g., cameras, mobile phones, laptops, exercise equipment, and so forth). In this manner, the IoT 114 is configured to provide information about interactions of the user with various devices (e.g., interaction with web-based applications, photos taken, communications with other users, and so forth). Alternatively or additionally, the IoT 114 may include various real-world articles (e.g., shoes, clothing, sporting equipment, appliances, automobiles, etc.) configured with sensors to provide information describing behavior, such as steps taken, force of a foot striking the ground, length of stride, temperature of a user (and other physiological measurements), temperature of a user's surroundings, types of food stored in a refrigerator, types of food removed from a refrigerator, driving habits, and so forth. Alternatively or additionally, the IoT 114 includes third parties to the CGM platform 112, such as medical providers (e.g., a medical provider of the person 102) and manufacturers (e.g., a manufacturer of the CGM system 104, the insulin delivery system 106, or the computing device 108) capable of providing medical and manufacturing data, respectively, platforms that track the person's 102 exercise and nutrition intake, that can be leveraged by the data analytics platform 122. Thus, the IoT 114 is representative of devices and sensors capable of providing a wealth of data without departing from the spirit or scope of the described techniques. In the context of measuring glucose, e.g., continuously, and obtaining data describing such measurements, consider the following description of FIG. 2.

Figure 2:
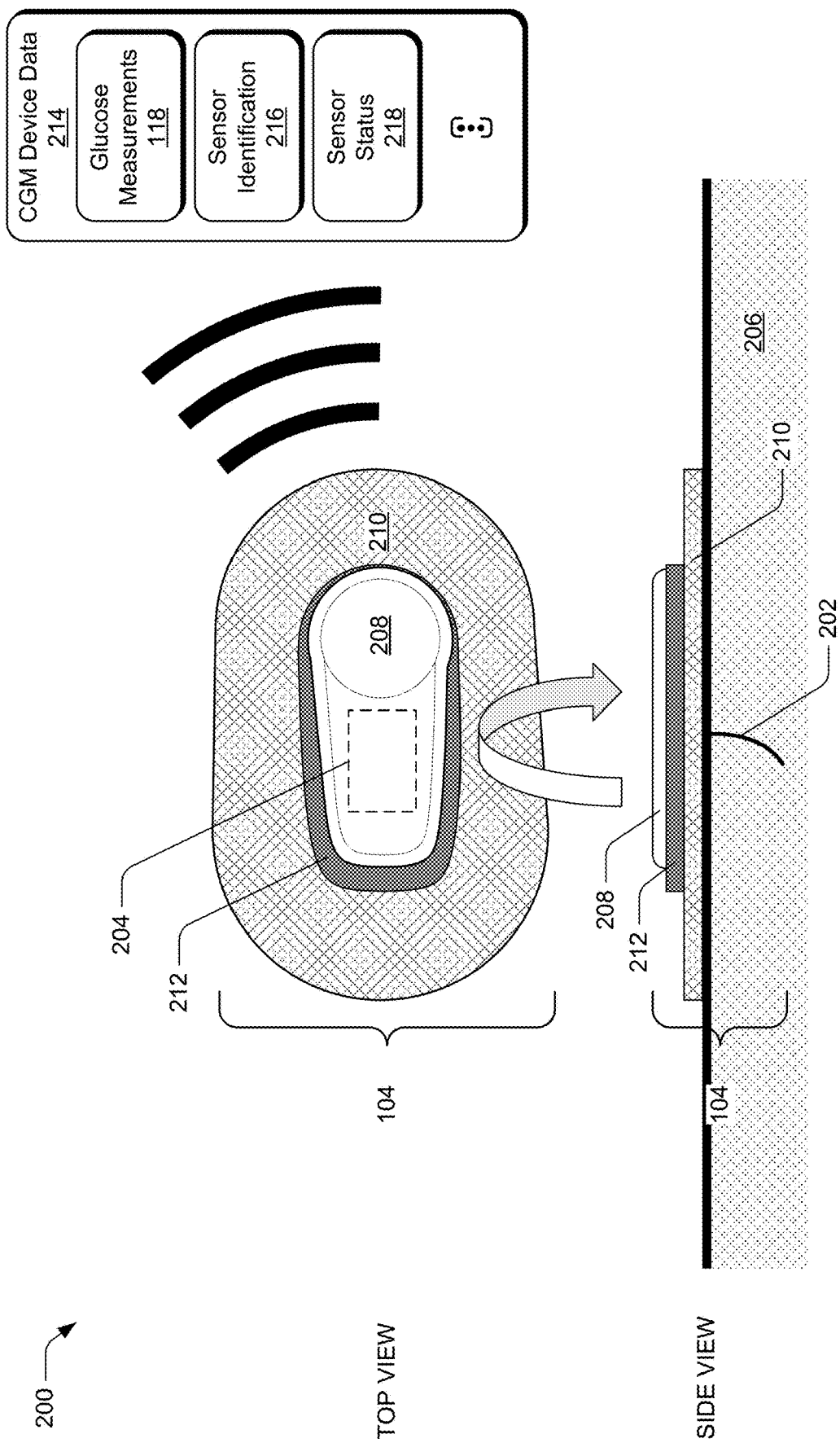
FIG. 2 depicts an example of the continuous glucose monitoring (CGM) system of FIG. 1 in greater detail.

FIG. 2 depicts an example implementation 200 of the CGM system 104 of FIG. 1 in greater detail. In particular, the illustrated example 200 includes a top view and a corresponding side view of the CGM system 104.

The CGM system 104 is illustrated as including a sensor 202 and a sensor module 204. In the illustrated example 200, the sensor 202 is depicted in the side view as inserted subcutaneously into skin 206 (e.g., skin of the person 102). The sensor module 204 is depicted in the top view as a rectangle having a dashed outline. The CGM system 104 is further illustrated as including a transmitter 208. Use of the dashed outline of the rectangle representing sensor module 204 indicates that the sensor module 204 may be housed in, or otherwise implemented within a housing of, the transmitter 208. In this example 200, the CGM system 104 further includes adhesive pad 210 and attachment mechanism 212.

In operation, the sensor 202, the adhesive pad 210, and the attachment mechanism 212 may be assembled to form an application assembly, where the application assembly is configured to be applied to the skin 206 so that the sensor 202 is subcutaneously inserted as depicted. In such scenarios, the transmitter 208 may be attached to the assembly after application to the skin 206, such as via the attachment mechanism 212. Additionally or alternatively, the transmitter 208 may be incorporated as part of the application assembly, such that the sensor 202, the adhesive pad 210, the attachment mechanism 212, and the transmitter 208 (with the sensor module 204) can all be applied to the skin 206 simultaneously. In one or more implementations, the application assembly is applied to the skin 206 using a separate applicator (not shown). This application assembly may also be removed by peeling the adhesive pad 210 off of the skin 206. In this manner, the CGM system 104 and its various components as illustrated in FIG. 2 represent one example form factor, and the CGM system 104 and its components may have different form factors without departing from the spirit or scope of the described techniques.

In operation, the sensor 202 is communicatively coupled to the sensor module 204 via at least one communication channel, which can be a "wireless" connection or a "wired" connection. Communications from the sensor 202 to the sensor module 204, or from the sensor module 204 to the sensor 202, can be implemented actively or passively and may be continuous (e.g., analog) or discrete (e.g., digital).

The sensor 202 may be a device, a molecule, and/or a chemical that changes, or causes a change, in response to an event that is at least partially independent of the sensor 202. The sensor module 204 is implemented to receive indications of changes to the sensor 202, or caused by the sensor 202. For example, the sensor 202 can include glucose oxidase, which reacts with glucose and oxygen to form hydrogen peroxide that is electrochemically detectable by an electrode of the sensor module 204. In this example, the sensor 202 may be configured as, or include, a glucose sensor configured to detect analytes in blood or interstitial fluid that are indicative of glucose levels using one or more measurement techniques.

In another example, the sensor 202 (or an additional, not depicted, sensor of the CGM system 104) can include first and second electrical conductors and the sensor module 204 can electrically detect changes in electric potential across the first and second electrical conductors of the sensor 202. In this example, the sensor module 204 and the sensor 202 are configured as a thermocouple, such that the changes in electric potential correspond to temperature changes. In some examples, the sensor module 204 and the sensor 202 are configured to detect a single analyte (e.g., glucose). In other examples, the sensor module 204 and the sensor 202 are configured to detect multiple analytes (e.g., sodium, potassium, carbon dioxide, and glucose). Alternatively or additionally, the CGM system 104 includes multiple sensors to detect not only one or more analytes (e.g., sodium, potassium, carbon dioxide, glucose, and insulin) but also one or more environmental conditions (e.g., temperature). Thus, the sensor module 204 and the sensor 202 (as well as any additional sensors) may detect the presence of one or more analytes, the absence of one or more analytes, and/or changes in one or more environmental conditions.

In one or more implementations, although not depicted in the illustrated example of FIG. 2, the sensor module 204 may include a processor and memory. By leveraging such a processor, the sensor module 204 may generate the glucose measurements 118 based on the communications with the sensor 202 that are indicative of one or more changes (e.g., analyte changes, environmental condition changes, and so forth). Based on communications with the sensor 202, the sensor module 204 is further configured to generate CGM device data 214. CGM device data 214 is representative of a communicable package of data that includes at least one glucose measurement 118. Alternatively or additionally, the CGM device data 214 includes other data, such as multiple glucose measurements 118, sensor identification 216, sensor status 218, combinations thereof, and so forth. In one or more implementations, the CGM device data 214 may include other information, such as one or more of temperatures that correspond to the glucose measurements 118 and measurements of other analytes. In this manner, the CGM device data 214 may include various data in addition to at least one glucose measurement 118, without departing from the spirit or scope of the described techniques.

In operation, the transmitter 208 may transmit the CGM device data 214 wirelessly as a stream of data to the computing device 108. Alternatively or additionally, the sensor module 204 may buffer the CGM device data 214 (e.g., in memory of the sensor module 204) and cause the transmitter 208 to transmit the buffered CGM device data 214 at various intervals, e.g., time intervals (every second, every thirty seconds, every minute, every five minutes, every hour, and so on), storage intervals (when the buffered CGM device data 214 reaches a threshold amount of data or a number of instances of CGM device data 214), combinations thereof, and so forth.

In addition to generating the CGM device data 214 and causing it to be communicated to the computing device 108, the sensor module 204 is configured to perform additional functionality in accordance with one or more implementations. This additional functionality of the sensor module 204 may also include calibrating the sensor 202 initially or on an ongoing basis as well as calibrating any other sensors of the CGM system 104. This computational ability of the sensor module 204 is particularly advantageous where connectivity to services via the network 116 is limited or non-existent.

With respect to the CGM device data 214, the sensor identification 216 represents information that uniquely identifies the sensor 202 from other sensors (e.g., other sensors of other CGM systems 104, other sensors implanted previously or subsequently in the skin 206, and the like). By uniquely identifying the sensor 202, the sensor identification 216 may also be used to identify other aspects about the sensor 202, such as a manufacturing lot of the sensor 202, packaging details of the sensor 202, shipping details of the sensor 202, and the like. In this way, various issues detected for sensors manufactured, packaged, and/or shipped in a similar manner as the sensor 202 may be identified and used in different ways (e.g., to calibrate the glucose measurements 118, to notify users to change or dispose of defective sensors, to notify manufacturing facilities of machining issues, etc.).

The sensor status 218 represents a state of the sensor 202 at a given time (e.g., a state of the sensor at a same time as one of the glucose measurements 118 is produced). To this end, the sensor status 218 may include an entry for each of the glucose measurements 118, such that there is a one-to-one relationship between the glucose measurements 118 and statuses captured in the sensor status 218 information. Generally, the sensor status 218 describes an operational state of the sensor 202. In one or more implementations, the sensor module 204 may identify one of a number of predetermined operational states for a given glucose measurement 118. The identified operational state may be based on the communications from the sensor 202 and/or characteristics of those communications.

By way of example, the sensor module 204 may include (e.g., in memory or other storage) a lookup table having the predetermined number of operational states and bases for selecting one state from another. For instance, the predetermined states may include a "normal" operation state where the basis for selecting this state may be that the communications from the sensor 202 fall within thresholds indicative of normal operation (e.g., within a threshold of an expected time, within a threshold of expected signal strength, when an environmental temperature is within a threshold of suitable temperatures to continue operation as expected, combinations thereof, and so forth). The predetermined states may also include operational states that indicate one or more characteristics of the sensor's 202 communications are outside of normal activity and may result in potential errors in the glucose measurements 118.

For example, bases for these non-normal operational states may include receiving the communications from the sensor 202 outside of a threshold expected time, detecting a signal strength of the sensor 202 outside a threshold of expected signal strength, detecting an environmental temperature outside of suitable temperatures to continue operation as expected, detecting that the person 102 has changed orientation relative to the CGM system 104 (e.g., rolled over in bed), and so forth. The sensor status 218 may indicate a variety of aspects about the sensor 202 and the CGM system 104 without departing from the spirit or scope of the techniques described herein.

Having considered an example environment and example CGM system, consider now a description of some example details of the techniques for determining similarity of sequences of glucose values in accordance with one or more implementations.

Determining Similarity of Sequences of Glucose Values

Figure 3:
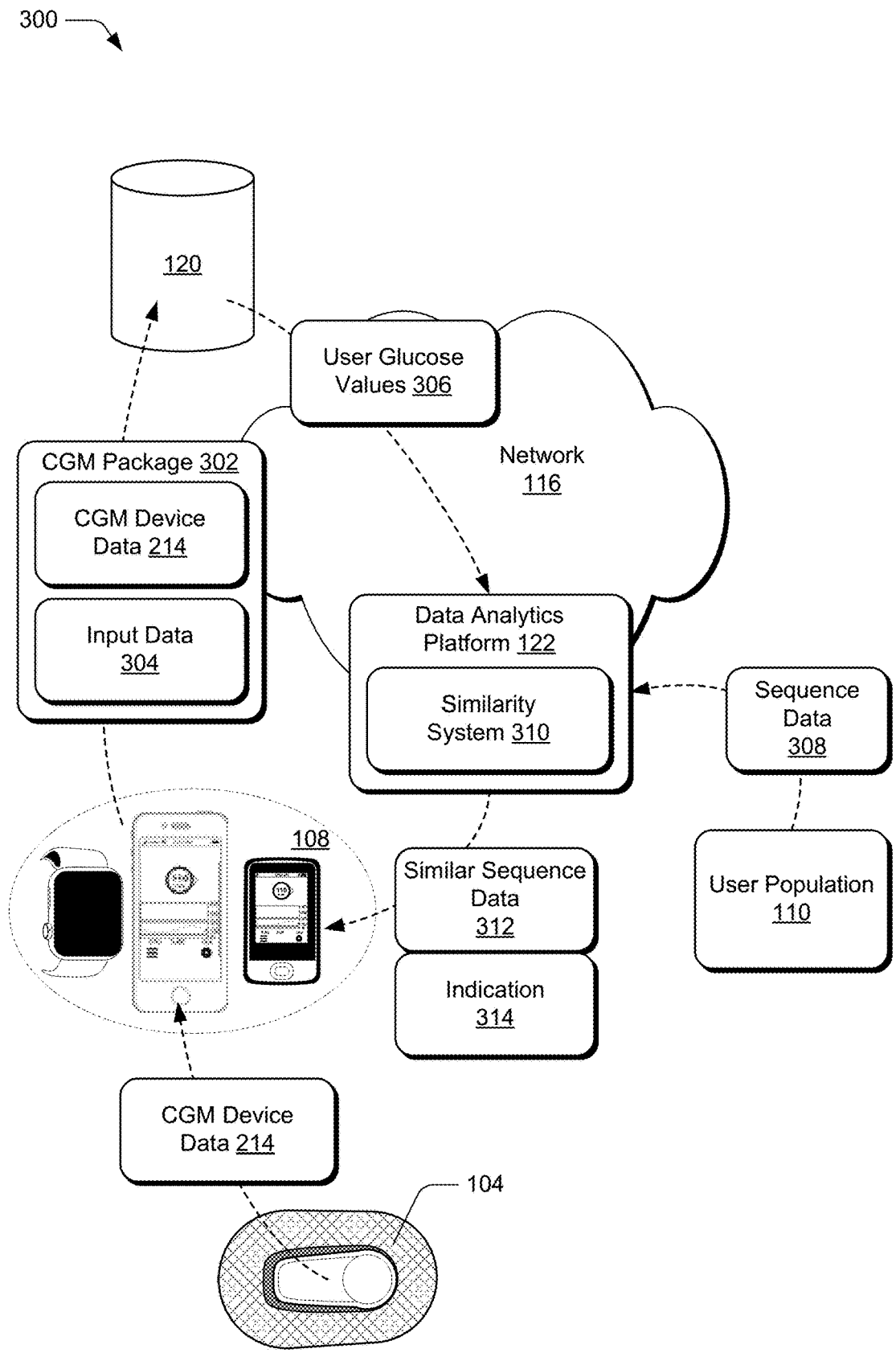
FIG. 3 depicts an example implementation in which a computing device communicates input data to a similarity system and the computing device receives similar sequence data from the similarity system in connection with determining similarity of sequences of glucose values.

FIG. 3 depicts an example 300 implementation in which a computing device communicates input data to a similarity system and the computing device receives similar sequence data from the similarity system in connection with determining similarity of sequences of glucose values.

The illustrated example 300 includes the CGM system 104 and examples of the computing device 108 introduced with respect to FIG. 1. The illustrated example 300 also includes the data analytics platform 122 and the storage device 120, which, as described above, stores the glucose measurements 118. In the example 300, the CGM system 104 is depicted as transmitting the CGM device data 214 to the computing device 108. As described with respect to FIG. 2, the CGM device data 214 includes the glucose measurements 118 along with other data. The CGM system 104 is configured to transmit the CGM device data 214 to the computing device 108 in a variety of ways.

The illustrated example 300 also includes CGM package 302. The CGM package 302 is representative of data including the CGM device data 214 (e.g., the glucose measurements 118, the sensor identification 216, and the sensor status 218), input data 304, and/or portions thereof. The input data 304 describes a sequence of user glucose values 306 which are extracted from the glucose measurements 118 in one example. For example, the person 102 interacts with the computing device 108 to specify the input data 304. In another example, the computing device 108 automatically generates the input data 304 describing the sequence of user glucose values 306. As shown, the CGM package 302 (which includes the input data 304) is stored in the storage device 120 and is available to the data analytics platform 122.

In the example 300, the data analytics platform 122 is illustrated as having, receiving, and/or transmitting the sequence of user glucose values 306. The data analytics platform 122 is also illustrated as having, receiving, and/or transmitting sequence data 308 that describes a plurality of sequences of glucose values. For example, the sequence data 308 describes sequences of glucose values associated with the user population 110. In another example, the sequence data 308 describes sequences of glucose values associated with the person 102. In some examples, the sequence data 308 describes sequences of glucose values associated with the user population 110 as well as sequences of glucose values associated with the person 102.

The data analytics platform 122 is illustrated to include a similarity system 310 which processes the sequence of user glucose values 306 and the sequence data 308 to generate similar sequence data 312. To do so, the similarity system 310 generates or accesses a similarity model. In an example in which the similarity system 310 generates the similarity model, the similarity system 310 defines a discrete random variable (e.g., a glucose variable having a range of discrete values from 39 to 401) and builds a categorical distribution of the discrete random variable based on observations from a corpus of glucose measurements 118. For example, the corpus includes millions of days of glucose measurements 118. In this example, the glucose measurements 118 included in the corpus are representative of many types of normal conditions as well as all known types of abnormal conditions.

In a first example, the corpus only includes glucose measurements 118 of the user population 110. In a second example, the corpus only includes glucose measurements 118 of the person 102. In a third example, the corpus includes glucose measurements 118 of the user population 110 as well as glucose measurements 118 of the person 102. Regardless of how the corpus is populated, the similarity system 310 builds the categorical distribution of the discrete random variable from data included in the corpus to generate the similarity model.

Once the similarity model is generated or accessed, the similarity system 310 implements the model to receive a particular glucose value and context data or evidence as an input. The similarity model is configured to output a probability of observing the particular glucose value given the context data or the evidence based on the observations from the corpus of glucose measurements 118. In one example, the observed categorical distribution of a glucose value given the context data or the evidence is a posterior distribution of the glucose value given the context data or the evidence. In this example, a distance or similarity between a first glucose value and a second glucose value given the context data or the evidence is a difference between a probability of observing the first glucose value with the context data or the evidence and a probability of observing the second glucose value with the context data or the evidence. Similarly, a distance or similarity between a first sequence of glucose values and a second sequence of glucose values given the context data or the evidence is representable as a sum of differences between probabilities of observing each glucose value included in the first sequence and every glucose value included in the second sequence given the context data or the evidence.

The similarity system 310 processes the sequence of user glucose values 306 and the sequence data 308 using the similarity model. For example, the similarity system 310 identifies a particular sequence of glucose values described by the sequence data 308 that is most similar to the sequence of user glucose values 306. In this example, the similarity system 310 generates the similar sequence data 312 as describing the particular sequence. The data analytics platform 122 communicates the similar sequence data 312 to the computing device 108, for example, via the network 116.

In an example, the similarity system 310 also determines an externality associated with the particular sequence. In this example, the externality is something which is known or estimated about the particular sequence and which is also inferable about the sequence of user glucose values 306. In some examples, the externality is determinable from data included in the particular sequence but in other examples the externality is not determinable from the particular sequence itself. For example, the externality may be an event that occurred or an event that did not occur (e.g., an avoided event). In examples, the externality is a normal condition, a meal consumed, a physical activity, a sensor identification 216, a sensor status 218, a modification of the CGM system 104, a notification, an alert, and so forth.

Consider an example in which the externality is related to an adverse event. For example, the particular sequence includes glucose values from glucose measurements 118 of an individual that experienced the adverse event or that avoided experiencing the adverse event. Because of the high degree of similarity between the particular sequence and the sequence of user glucose values 306, the person 102 may also experience the adverse event or avoid experiencing the adverse event.

Consider an example in which the externality is related to an intervention. In this example, the intervention may be with respect to the adverse event such as the intervention occurred as a result of the adverse event, the intervention prevented the adverse event from occurring, and so forth. Accordingly, the similarity system 310 generates an indication 314 of the externality.

The indication 314 is generated to indicate the externality to the person 102 in one example. For example, the similarity system 310 generates the indication 314 responsive to a query. In some examples, the indication 314 is a counterfactual prediction such as a prediction indicating how a physical activity will likely impact the person's 102 future glucose measurements 118.

The similarity system 310 determines the externality in a variety of different ways. For example, the externality is described in metadata associated with the particular sequence and the similarity system 310 determines the externality by processing the metadata. In this example, the sequences of glucose values described by the sequence data 308 are tagged with associated externalities and the similarity system 310 generates the indication based on these tagged externalities.

As shown, the computing device 108 receives the similar sequence data 312 and the indication 314. For example, the computing device 108 processes the similar sequence data 312 to generate an indication of the particular sequence. In this example, the computing device 108 renders the indication of the particular sequence in a user interface responsive to a user query requesting the particular sequence. In some examples, the computing device 108 renders the indication 314 in the user interface as well to communicate the externality to the person 102.

Figure 4:
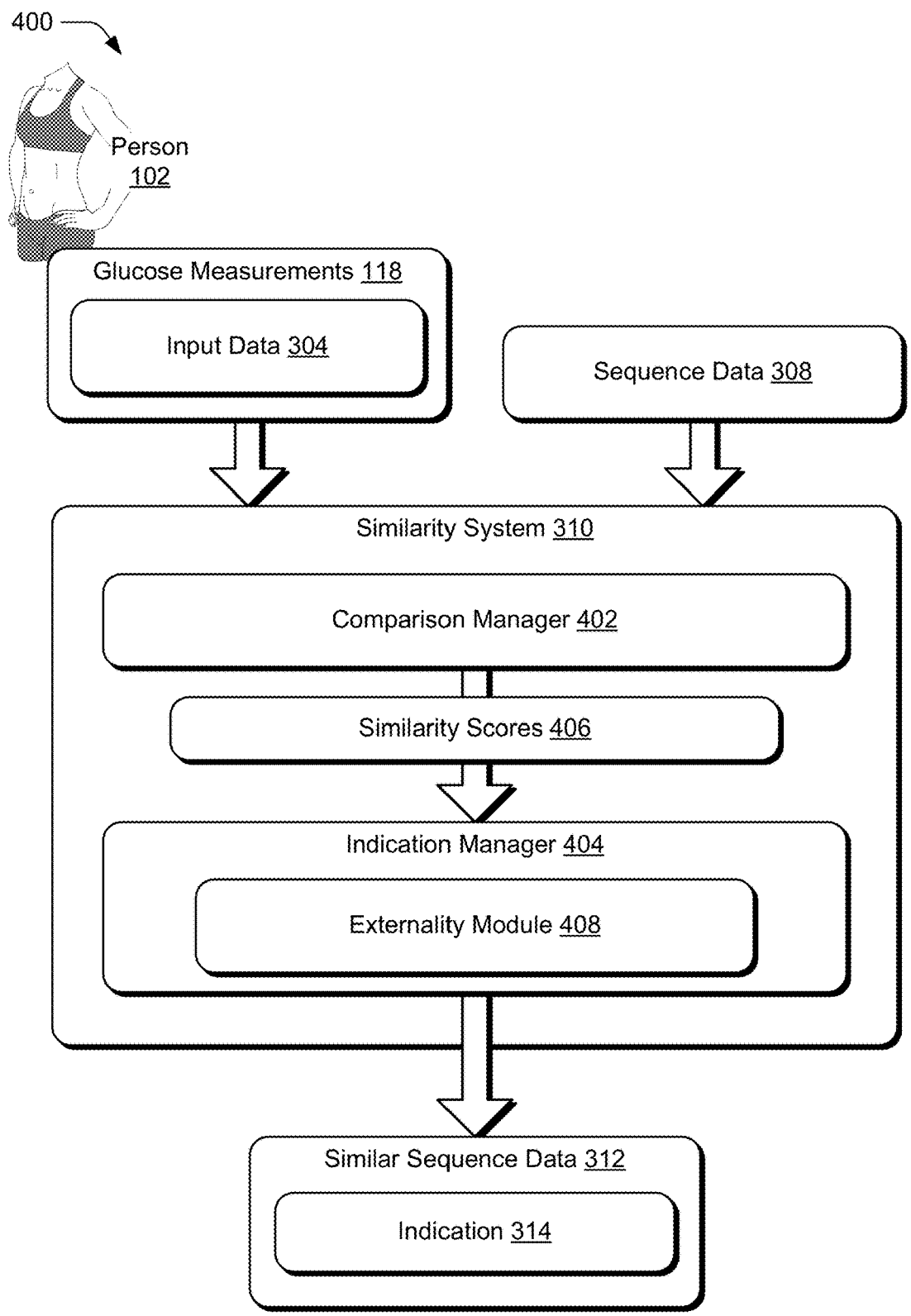
FIG. 4 depicts an example implementation of the similarity system of FIG. 3 in greater detail.

FIG. 4 depicts an example 400 implementation of the similarity system 310 of FIG. 3 in greater detail. The similarity system 310 is illustrated to include a comparison manager 402 and an indication manager 404. As shown, the comparison manager 402 receives the input data 304 and the sequence data 308 as inputs. In this example, the input data 304 is included in the glucose measurements 118 but in other examples the input data 304 is not included in the glucose measurements 118. The comparison manager 402 processes the input data 304 and the sequence data 308 to generate similarity scores 406. For example, the similarity model is available to or included in the comparison manager 402, and the comparison manager 402 leverages the similarity model to generate the similarity scores 406.

To do so in one example, the comparison manager 402 determines a probability of observing a glucose value included in the sequence of user glucose values 306 given context data or evidence. The comparison manager 402 also determines a probability of observing each glucose value in a particular sequence of glucose values included in the sequence data 308 given the context data or the evidence. The comparison manager 402 then computes a difference between the probability of observing the glucose value in the sequence of user glucose values 306 and each of the probabilities of observing the glucose values included in the particular sequence given the context data or the evidence. The comparison manager 402 then repeats this process for another glucose value included in the sequence of user glucose values 306 until the comparison manager 402 has computed a difference between a probability of observing each glucose value included in the sequence of user glucose values 306 and a probability of observing every glucose value included in the particular sequence given the context data or the evidence. The comparison manager 402 determines a similarity score for the particular sequence as a sum of all of the differences in probabilities.

The similarity score for the particular sequence represents a distance or a similarity between the particular sequence and the sequence of user glucose values 306. For example, the comparison manager 402 computes a reciprocal of the sum of differences in probabilities such that a higher similarity score corresponds to a higher similarity and a lower similarity score corresponds to a lower similarity. The comparison manager 402 generates the similarity scores 406 as including the similarity score for the particular sequence as well as similarity scores for each sequence of glucose values described by the sequence data 308.

In some examples, the comparison manager 402 compares subsequences of user glucose values with subsequences of the particular sequence alternatively or in addition to comparing each glucose value included in the sequence of user glucose values 306 with every glucose value included in the particular sequence. For example, the comparison manager 402 first compares the subsequences of user glucose values with the subsequences of glucose values included in the particular sequence to approximate the distance or similarity between the sequence of user glucose value 306 and the particular sequence. Based on this approximation, the comparison manager 402 determines whether or not to compare the glucose values. In one example, the comparison manager 402 generates the similarity score for the particular sequence based on the comparison of the subsequences of user glucose values and the subsequences of glucose values included in the particular sequence.

As shown, the indication manager 404 receives the similarity scores 406 and the indication manager 404 compares the similarity scores 406 to determine a highest similarity score. The indication manager 404 identifies a sequence of glucose values that corresponds to the highest similarity score in this example. For example, the particular sequence is associated with the highest similarity score included in the similarity scores 406. In this example, the indication manager 404 generates the similar sequence data 312 as describing the particular sequence.

The indication manager 404 is illustrated to include an externality module 408 and the indication manager 404 implements the externality module 408 to determine an externality associated with the particular sequence. For example, the particular sequence has metadata that describes the externality and the externality module 408 processes the metadata to determine the externality. As previously described, the externality is something which is known or estimated about the particular sequence and which is also inferable about the sequence of user glucose values 306. The externality module 408 generates the indication 314 as describing the externality.

Figure 5:
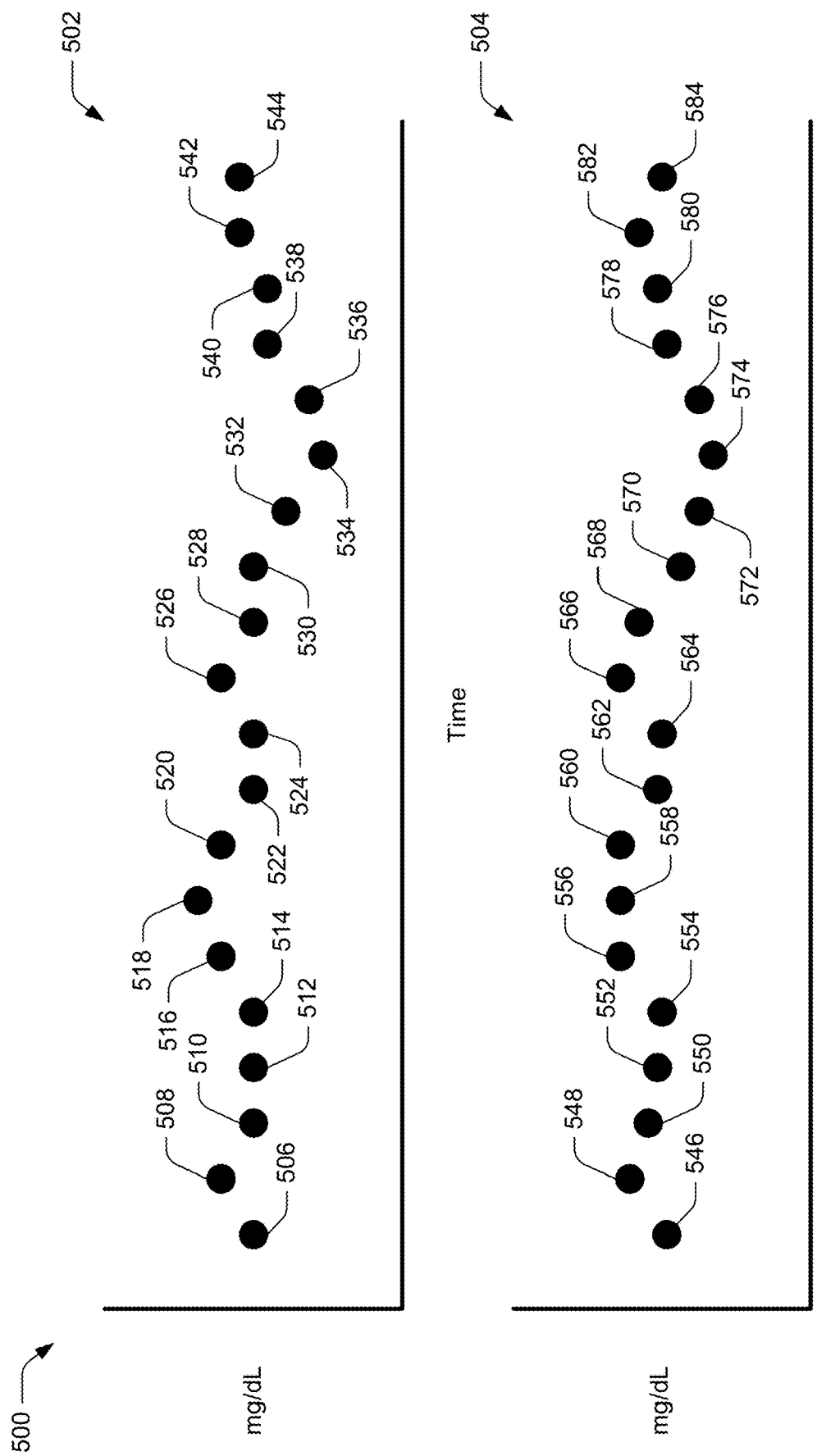
FIG. 5 illustrates a representation of determining similarity of sequences of glucose values.

FIG. 5 illustrates a representation 500 of determining similarity of sequences of glucose values. The representation 500 includes a first sequence 502 and a second sequence 504. The first sequence 502 includes glucose values 506-544 as a first timeseries and the second sequence 504 includes glucose values 546-584 as a second timeseries. Consider an example in which the similarity system 310 determines a distance or a similarity between the first sequence 502 and the second sequence 504. For example, the similarity system 310 leverages the similarity model to determine a difference between a probability of observing each of the glucose values 506-544 given evidence or context data and a probability of observing every one of the glucose values 546-584 given the evidence or the context data.

The evidence or the context data for a particular one of the glucose values 506-544 refers to a local structure around the particular one of the glucose values 506-544 in sequential order. In a first example, the evidence or the context data for glucose value 524 includes glucose value 522 and glucose value 526. Accordingly, the similarity system 310 uses the similarity model to determine a probability of observing the glucose value 524 given an observation of the glucose value 522 and the glucose value 526. In one example, the similarity system 310 then determines a difference between this probability and probabilities of observing the glucose values 546-584 given the evidence or the context data.

For example, the similarity system 310 uses the similarity model to determine a probability of observing glucose value 546 given the observation of the glucose values 522, 526 and subtracts this probability from the probability of observing the glucose value 524 given the observation of the glucose values 522, 526. In this example, the similarity system 310 then determines a probability of observing glucose value 548 given the observation of the glucose values 522, 526 and subtracts this probability from the probability of observing the glucose value 524 given the observation of the glucose values 522, 526. Continuing this example, the similarity system 310 next determines a probability of observing glucose value 550 given the observation of the glucose values 522, 526 and subtracts this probability from the probability of observing the glucose value 524 given the observation of the glucose values 522, 526. The similarity system 310 repeats this process for every one of the glucose values 552-584 in this example and then repeats that process for each of the glucose values 506-544.

For example, the similarity system 310 determines a probability of observing the glucose value 526 given an observation of the glucose value 524 and glucose value 528. The similarity system 310 then determines a probability of observing the glucose value 546 given the observation of the glucose values 524, 528 and subtracts this probability from the probability observing the glucose value 526 given the observation of the glucose values 524, 528. Continuing this example, the similarity system 310 determines a probability of observing the glucose value 548 given the observation of the glucose values 524, 528 and subtracts this probability from the probability observing the glucose value 526 given the observation of the glucose values 524, 528. In this example, the similarity system 310 determines a probability of observing the glucose value 550 given the observation of the glucose values 524, 528 and subtracts this probability from the probability observing the glucose value 526 given the observation of the glucose values 524, 528. The similarity system 310 repeats this process for every one of the glucose values 552-584. For example, the similarity system sums all of these differences as a similarity score for the second sequence 504.

In another example, the similarity system 310 defines the evidence or the context data for a particular one of the glucose values 506-544 as including multiple glucose values before and after the particular one of the glucose values. For example, the similarity system 310 determines a probability of observing the glucose value 524 given an observation of glucose values 520, 522, 526, 528. In this example, the similarity system 310 determines a probability of observing the glucose value 546 given the observation of the glucose values 520, 522, 526, 528 and subtracts this probability from the probability of observing the glucose value 524 given the observation of the glucose values 520, 522, 526, 528. The similarity system 310 repeats this process for each of the glucose values 548-584.

For example, the similarity system 310 defines the evidence or the context data for a particular one of the glucose values 506-544 as three glucose values before and three glucose values after the particular one of the glucose values. In one example, the similarity system 310 defines the evidence or the context data for a particular one of the glucose values 506-544 as four glucose values before and four glucose values after the particular one of the glucose values. In another example, the similarity system compares subsequences of the first sequence 502 and subsequences of the second sequence 504 to determine a distance or a similarity between the first and second sequences 502, 504. In this example, the first sequence 502 includes subsequence 506-514, subsequence 516-524, subsequence 526-534, and subsequence 536-544. The second sequence 504 includes subsequence 546-554, subsequence 556-564, subsequence 566-574, and subsequence 576-584. The similarity system 310 compares each of the subsequences of the first sequence 502 with each of the subsequences of the second sequence 504 in a same or similar manner as comparing each of the glucose values 506-544 with every one of the glucose values 546-584.

For example, the similarity system 310 constructs a matrix having 363 rows and 363 columns as a distance penalty matrix to determine a distance or a similarity between the first sequence 502 and the second sequence 504. In this example, the rows are numbered 39 to 401 and the columns are numbered 39 to 401. Row, column index 39, 39 includes a zero and the remaining indices of the first row include a distance parameter. Index 40, 39 includes a zero and index 40, 40 includes a zero. The remaining indices of row 40 include the distance parameter. Indices 41, 39; 41, 40; and 41, 41 each include a zero. The remaining indices of row 41 include the distance parameter. The distance penalty matrix is populated in this manner until row 401 which is entirely populated with zeros. The similarity system 310 uses the distance penalty matrix to compute distances between all pairs of the glucose values 506-544 and the glucose values 546-584 and sums all of these distances as the similarity score for the second sequence 504.

In one example, the similarity system 310 reduces an amount of computation required to determine a distance or a similarity between the first sequence 502 and the second sequence 504. To do so, the similarity system 310 leverages a distance of zero between identical values included in both the glucose values 506-544 and the glucose values 546-584 and also sets distances between the glucose values 506-544 and the glucose values 546-584 that are greater than a distance threshold equal to a large constant. In one example, the distance threshold is 50 mg/dL. In other examples, the distance threshold is greater than 50 mg/dL or less than 50 mg/dL. In this manner, the similarity system 310 may reduce the amount of computation required to determine the distance or the similarity between the first sequence 502 and the second sequence 504 by as much as 50 percent. In another example, the similarity system 310 determines the distance or the similarity between the first sequence 502 and the second sequence 504 by comparing the subsequences 506-514, 518-524, 526-534, and 536-544 with the subsequences 546-554, 556-564, 566-574, and 576-584 which reduces the amount of computation by another 50 percent. For example, the similarity system 310 compares the subsequence 506-514 with each of the subsequences 546-554, 556-564, 566-574, and 576-584; the similarity system 310 compares the subsequence 518-524 with each of the subsequences 546-554, 556-564, 566-574, and 576-584; the similarity system 310 compares the subsequence 526-534 with each of the subsequences 546-554, 556-564, 566-574, and 576-584; and the similarity system 310 compares the subsequence 536-544 with each of the subsequences 546-554, 556-564, 566-574, and 576-584.

For example, the similarity system 310 may determine a similarity or a distance between the first sequence 502 and the second sequence 504 by determining probabilities of observing the glucose values 546-584 given evidence or context data. In this example, the similarity system 310 then determines probabilities of observing the glucose values 506-544 given the evidence or the context data. Continuing this example, the similarity system 310 then computes differences between the probabilities of observing the glucose values 546-584 and the probabilities of observing the glucose values 506-544 and sums the differences as a similarity score for the second sequence 504.

The similarity system 310 implements the similarity model to determine a probability of observing glucose value 562 given an observation of glucose value 560 and an observation of glucose value 564. The similarity system 310 determines a probability of observing the glucose value 506 given the observation of the glucose values 560, 564 and subtracts this probability from the probability of observing the glucose value 562 given the observation of the glucose values 560, 564. Continuing this example, the similarity system 310 determines a probability of observing the glucose value 508 given the observation of the glucose values 560, 564 and subtracts this probability from the probability of observing the glucose value 562 given the observation of the glucose values 560, 564. The similarity system 310 repeats this process for each of the glucose values 510-544.

The similarity system 310 then determines a probability of observing the glucose value 564 given an observation of the glucose value 562 and an observation of glucose value 566. The similarity system 310 leverages the similarity model to determine a probability of observing the glucose value 506 given the observation of the glucose values 562, 566 and subtracts this probability from the probability of observing the glucose value 564 given the observation of the glucose values 562, 566. The similarity system 310 then determines a probability of observing the glucose value 508 given the observation of the glucose values 562, 566 and subtracts this probability from the probability of observing the glucose value 564 given the observation of the glucose values 562, 566. The similarity system 310 repeats this process for each of the glucose values 510-544. For example, the similarity system 310 determines differences between probabilities of observing each of the glucose values 546-584 given evidence or context data and probabilities of observing every one of the glucose values 506-544 given the evidence or the context data. The sum of all of these differences is equal to a similarity score for the second sequence 504 in this example.

Consider an example in which there is a gap between glucose values included in the first sequence 502 and/or the second sequence 504. In this example, evidence or context data is incomplete or unavailable for the glucose values 506-544 and/or the glucose values 546-584. In a first example, the similarity system 310 estimates glucose values to complete the incomplete or unavailable evidence or context data. For example, if no glucose value is included between the glucose value 518 and the glucose value 522 in the first sequence 502, then the similarity system 310 estimates the glucose value 520 by linearly interpolating between the glucose value 518 and the glucose value 522.

In one example, the similarity system 310 only estimates the glucose value 520 for the purposes of completing the incomplete or unavailable evidence or context data. In the example in which the similarity system 310 estimates the glucose value 520, the similarity system 310 determines a probability of observing the glucose value 518 given an observation of glucose value 516 and an observation of the glucose value 520. The similarity system 310 subtracts probabilities of observing each of the glucose values 546-584 given the observation of the glucose values 516, 520 from the probability of observing the glucose value 518 given the observation of the glucose values 516, 520.

Continuing the previous example, the similarity system 310 also determines a probability of observing the glucose value 522 given an observation of the glucose value 520 and an observation of the glucose value 524. The similarity system 310 then subtracts probabilities of observing each of the glucose values 546-584 given the observation of the glucose values 520, 524 from the probability of observing the glucose value 522 given the observation of the glucose values 520, 524. The similarity system 310 repeats this process for each of the glucose values 506-516 and 524-544 and sums all of these differences as a similarity score for the second sequence 504.

In another example, the similarity system 310 estimates the glucose value 520 for comparison with the glucose values 546-584. In this example, the similarity system 310 repeats the processes of the previous example and additionally determines a probability of observing the glucose value 520 given an observation of the glucose value 518 and an observation of the glucose value 522. For example, the similarity system 310 subtracts probabilities of observing each of the glucose values 546-584 given the observation of the glucose values 518, 522 from the probability of observing the glucose value 520 given the observation of the glucose values 518, 522. The similarity system 310 then sums all of these differences as a similarity score for the second sequence 504.

In one example, instead of estimating glucose values to complete the incomplete or unavailable evidence or context data, the similarity system 310 leverages whatever evidence or context data is available to determine similarity of sequences of glucose values. For example, the similarity system 310 determines a probability of observing glucose value 506 given evidence or context data. In this example, the glucose value 506 is a first value of the first sequence 502 and no glucose value is available before the glucose value 506. For example, the similarity system 310 implements the similarity model to determine a probability of observing the glucose value 506 given an observation of glucose value 508. The similarity system 310 then determines a probability of observing the glucose value 546 given the observation of the glucose value 508 and subtracts this probability from the probability of observing the glucose value 506 given the observation of the glucose value 508. The similarity system 310 then determines a probability of observing the glucose value 548 given the observation of the glucose value 508 and subtracts this probability from the probability of observing the glucose value 506 given the observation of the glucose value 508. For example, the similarity system 310 repeats this process for each of the glucose values 550-584.

Missing or Unavailable Glucose Values

As outlined above, the first sequence 502 is a timeseries of the glucose values 506-544 and the second sequence 504 is a timeseries of the glucose values 546-584. Because of this, any particular glucose value included in the glucose values 506-544 is related to each of the other glucose values included in the glucose values 506-544. Similarly, any particular glucose value included in the glucose values 546-584 is related to each of the other glucose values included in the glucose values 546-584.

However, a variety of anticipated and unanticipated scenarios exist in which one or more of the glucose values 506-544 and/or the glucose values 546-584 is missing (e.g., the person 102 disconnects the CGM system 104 to replace the sensor 202) or unavailable (e.g., the sensor status 218 indicates that a particular glucose measurement 118 is likely inaccurate). Additionally, various scenarios exist in which glucose values are missing or unavailable in the sequence of user glucose values 306. For example, the sequence data 308 describes sequences of glucose values associated with the user population 110 with missing/unavailable glucose values.

As previously noted, the similarity system 310 is capable of estimating missing or unavailable glucose values for completing incomplete or unavailable evidence or context data. In some examples, the computing device 108 and/or the CGM system 104 are individually or collectively capable of estimating missing or unavailable glucose values for completing the incomplete/unavailable evidence or context data. For example, the computing device 108 and/or the CGM system 104 are individually or collectively capable of estimating missing or unavailable glucose values for other purposes such as for displaying the estimated values in a user interface, to compute the person's 102 TIR, as part of generating an alarm or an alert for the person 102, and so forth.

Consider an example in which the computing device 108 and/or the CGM system 104 leverage observations from a database of glucose measurements 118 to estimate missing or unavailable glucose values. For example, the database of glucose measurements 118 includes the corpus of glucose measurements 118 used to build the categorical distribution of the discrete random variable. In a first example, the database of glucose measurements 118 only includes glucose measurements of the person 102. In a second example, the database of glucose measurements 118 only includes glucose measurements of the user population 110. In a third example, the database of glucose measurements 118 includes glucose measurements of the person 102 and of the user population 110.

For instance, the database of glucose measurements 118 may include actual glucose measurements 118 of the person 102 and/or of the user population 110. The database of glucose measurements 118 may also include synthetic glucose measurements instead of including the actual glucose measurements 118 of the person 102 and/or of the user population 110. For example, the synthetic glucose measurements may be generated from the actual glucose measurements 118 of the person 102 and/or of the user population 110 in a manner which complies with regulatory requirements, privacy expectations, informed consent of the person 102 and the user population 110, etc.

In an example, the synthetic glucose measurements are generated using a machine learning model trained on training data that is generated from the actual glucose measurements 118 of the person 102 and/or of the user population 110. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In one example, the synthetic glucose measurements are generated using a differentially private generative adversarial network that includes a generator network and a discriminator network. In this example, the differentially private generative adversarial network learns a distribution of training data that includes the actual glucose measurements 118 of the person 102 and/or of the user population 110. Gradients for weights of the generator network are computed by minimizing a loss function using the training data that includes the actual glucose measurements 118.

Continuing this example, per sample gradients are generated from the gradients using a clipping bound. Gaussian noise is computed having a variance that is proportional to the clipping bound, and the computed Gaussian noise is added to the per sample gradients. After adding the Gaussian noise to the per sample gradients, the differentially private generative adversarial network is updated to minimize a privacy loss. The synthetic glucose measurements are then generated using the updated differentially private generative adversarial network which obfuscates the actual glucose measurements 118 of the person 102 and/or of the user population 110.

In another example in which the synthetic glucose measurements are generated using a differentially private generative adversarial network, a differentially private discriminator network is trained using training data that includes the actual glucose measurements 118 of the person 102 and/or of the user population 110. After training the differentially private discriminator network on the training data that includes the actual glucose measurements 118 of the person 102 and/or of the user population 110, Gaussian noise is added to the training data to generate private training data. The differentially private generative adversarial network is retrained using the private training data and the trained differentially private discriminator network (e.g., that is trained on the training data that includes the actual glucose measurements 118). In this manner, a generator network of the differentially private generative adversarial network is trained on the private training data to generate synthetic glucose measurements that are indistinguishable from the actual glucose measurements 118 of the person 102 and/or of the user population 110.

In an additional example, the synthetic glucose measurements are generated using a generative adversarial network that includes a first convolutional neural network configured as a generator network and a second convolutional neural network configured as a discriminator network. In this additional example, the generative adversarial network is trained on training data that includes digital images and/or digital data. For instance, the digital images visually depict the actual glucose measurements 118 of the person 102 and/or of the user population 110. In order to generate the training data, the glucose measurements 118 can be converted into visual representations of the information included in the glucose measurements 118 and these visual representations can be captured as digital images or digital data for training the generative adversarial network.

For example, the visual representations are graphs or plots of the glucose measurements 118 over time. In an example, the first sequence 502 and the second sequence 504 are visual representations of the glucose measurements 118, which are convertible to digital images for including in the training data. Continuing this example, the generator network and the discriminator network are trained using adversarial training on the training data. For instance, as part of this adversarial training, the generator network learns to generate visual representations of glucose measurements which the discriminator network learns to classify as real (e.g., included in the true training data) or fake (e.g., generated by the generator network). Once trained, the visual representations of glucose measurements generated by the generator network are converted into timeseries representations, which are usable as the synthetic glucose measurements.

Although the synthetic glucose measurements are described relative to examples of the database of glucose measurements 118, it is to be appreciated that in some examples, the sequence data 308 describes the synthetic glucose measurements and/or the input data 304 describes the synthetic glucose measurements. For example, instead of describing the sequences of glucose values associated with the user population 110, the sequence data 308 describes synthetic glucose measurements generated from actual glucose measurements 118 of the user population 110. In one example, instead of describing the sequences of glucose values associated with the person 102, the sequence data 308 describes synthetic glucose measurements generated from actual glucose measurements 118 of the person 102. In another example, instead of describing the sequence of user glucose values 306, the input data 304 describes synthetic glucose measurements generated from actual glucose measurements 118. Accordingly, the similarity system 310 is capable of identifying sequences of glucose values that are similar to sequences of synthetic glucose measurements and the similarity system 310 is also capable of identifying sequences of synthetic glucose measurements that are similar to sequences of glucose values.

Regardless of whether the database of glucose measurements 118 include the synthetic glucose measurements, the actual glucose measurements 118, or a combination of synthetic and actual glucose measurements 118, distributions of sequences of glucose values included in the database are leverageable to estimate missing or unavailable glucose values. Consider the sequence of glucose values 506, 508, 510, 512, 514 in an example in which glucose value 510 is missing or unavailable. For example, the glucose values 506-514 are 100 mg/dL, 101 mg/dL, XXX mg/dL, 103 mg/dL, and 104 mg/dL, respectively. The computing device 108 and/or the CGM system 104 query the database of glucose measurements 118 to identify similar sequences of glucose values and a frequency of occurrence of the identified similar sequences in the database of glucose measurements 118.

For example, the computing device 108 and/or the CGM system 104 identify the similar sequences of glucose values based on each glucose value included in the sequence of glucose values 506, 508, XXX, 512, 514 and each glucose value included in the similar sequences of glucose values. In this example, the computing device 108 and/or the CGM system 104 identify the similar sequences of glucose values based on sequential properties of the glucose values included in the similar sequences as a timeseries as described above. For instance, the computing device 108 and/or the CGM system 104 compute similarity scores 406 between the sequence of glucose values 506, 508, XXX, 512, 514 and sequences of glucose values included in the database of glucose measurements 118 by summing differences between probabilities of observing each of the glucose values 506, 508, 512, 514 given evidence or context data and probabilities of observing each glucose value included in the sequences of glucose values in the database of glucose measurements 118 given the evidence or context data. In an example, the computing device 108 and/or the CGM system 104 identify the similar sequences of glucose values based solely on the similarity scores 406 as described above. In another example, the computing device 108 and/or the CGM system 104 do not identify the similar sequences of glucose values using the similarity scores 406 or the similar sequences of glucose values are only partially identified using the similarity scores 406.

In one example, the computing device 108 and/or the CGM system 104 use the similarity system 310 to identify the similar sequences in the database of glucose measurements 118. In this example, the similarity system 310 computes the similarity scores 406 using the database of glucose measurements 118 as the sequence data 308 and using the sequence of glucose values 100 mg/dL, 101 mg/dL, XXX mg/dL, 103 mg/dL, 104 mg/dL as the input data 304. For example, the similarity system 310 computes the similarity scores 406 by treating the missing or unavailable glucose value 510 as a "do not care" value such that the similarity scores 406 are computed based on glucose values 100 mg/dL, 101 mg/dL, XXX mg/dL, 103 mg/dL, 104 mg/dL where XXX is allowed to be any value (e.g., XXX is any value in a range of 40 to 400 mg/dL). In some examples to reduce a search space, XXX is any value in a subset of the range of 40 to 400 mg/dL where the subset excludes extreme or unusual values from the range such as 40 mg/dL, 400 mg/dL, etc.

In another example in which the computing device 108 and/or the CGM system 104 leverage the similarity system 310 to identify the similar sequences in the database of glucose measurements 118, instead of treating the missing or unavailable glucose value 510 as a "do not care" value, the similarity scores 406 are computed using a placeholder for the missing or unavailable glucose value 510. In this other example, the placeholder may be an average value of the values 100 mg/dL, 101 mg/dL, 103 mg/dL, and 104 mg/dL. For example, if a number of glucose values 506, 508 which are available before the missing or unavailable glucose value 510 in the sequence of glucose values 506, 508, 510, 512, 514 is greater than a first threshold minimum number and less than a first threshold maximum number, then the computing device 108 and/or the CGM system 104 may compute the placeholder as an average of the glucose values 506, 508. In this example, the first threshold minimum number ensures that a number of the glucose values 506, 508 (i.e., two in this example) is large enough to avoid introducing an under-sampling error/anomaly in the placeholder. Similarly, the first threshold maximum number ensures that the number of the glucose values 506, 508 is small enough to avoid introducing an over-sampling error/anomaly in the placeholder.

Continuing the previous example, if a number of glucose values 512, 514 which are available after the missing or unavailable glucose value 510 in the sequence of glucose values 506, 508, 510, 512, 514 is greater than a second threshold minimum number and less than a second threshold maximum number, then the computing device 108 and/or the CGM system 104 may compute the placeholder as an average of the glucose values 512, 514. For instance, the second threshold minimum number prevents an introduction of an under-sampling error/anomaly in the placeholder and the second threshold maximum number prevents an introduction of an over-sampling error/anomaly in the placeholder. In one example, the computing device 108 and/or the CGM system 104 compute the placeholder as an average of the glucose values 506, 508, 512, 514 if the first and second minimum threshold numbers and the first and second maximum threshold numbers are met by numbers of glucose values available before and after the missing or unavailable glucose value 510.

In other examples, the computing device 108 and/or the CGM system 104 compute the placeholder by linearly interpolating the glucose value 508 and the glucose value 512. For example, the placeholder is computable of an average value of the glucose measurements included in the database of glucose measurements 118. In one example, the placeholder is computed as an arbitrary or random value selected from a range of 40 to 400 mg/dL.

In some examples, the placeholder is computed iteratively based on glucose values included in similar sequences and/or similar distributions of sequences identified in iterative searches of the database of glucose measurements 118. Consider an example in which the computing device 108 and/or the CGM system 104 implement the similarity system 310 to search the database of glucose measurements 118 to identify a first most similar sequence and/or a first most similar distribution of sequences (based on the similarity scores 406) to an input sequence of glucose values 100 mg/dL, 101 mg/dL, XXX mg/dL, 103 mg/dL, 104 mg/dL where XXX is a random value selected from a range of 40 to 400 mg/dL. A new placeholder value is computed based on the first most similar sequence and/or the first most similar distribution of sequences, and the similarity system 310 searches the database of glucose measurements 118 to identify a second most similar sequence and/or a second most similar distribution of sequences to an input sequence of glucose values 100 mg/dL, 101 mg/dL, YYY mg/dL, 103 mg/dL, 104 mg/dL where YYY is the new placeholder value. The similarity system 310 computes an additional new placeholder value based on the second most similar sequence and/or the second most similar distribution of sequences, and the similarity system 310 continues to search the database of glucose measurements 118 and recompute the placeholder based on results of prior searches until a particular placeholder value is identified which is substantially identical to computed placeholders from results of a prior search or multiple prior searches. For example, the particular placeholder value is usable as an estimate of the missing or unavailable glucose value 510.

In some examples, the computing device 108 and/or the CGM system 104 implement the similarity system 310 to identify the similar sequences in the database of glucose measurements 118 by identifying similar subsequences (and/or similar distributions of subsequences) to subsequences of glucose values 506, 508, 510, 512, 514. For example, identified similar subsequences are usable to compute the placeholder with greater accuracy than identifying similar sequences to compute the placeholder in some scenarios. Consider an example in which the similarity system 310 searches the database of glucose measurements 118 to identify a first similar subsequence and/or a first similar distribution of subsequences to an input subsequence of 100 mg/dL, 101 mg/dL, XXX mg/dL where XXX is a "do not care" value for the missing or unavailable glucose value 510. The similarity system 310 uses the identified first similar subsequence and/or the identified first similar distribution of subsequences to estimate a first subsequence value for the missing or unavailable glucose value 510.

Continuing the previous example, the similarity system 310 searches the database of glucose measurements 118 to identify a second similar subsequence and/or a second similar distribution of subsequences to an input subsequence of XXX mg/dL, 103 mg/dL, 104 mg/dL where XXX is a "do not care" value for the missing or unavailable glucose value 510. The similarity system 310 uses the identified second similar subsequence and/or the identified second similar distributions of subsequences to estimate a second subsequence value for the missing or unavailable glucose value 510. In a first example, the similarity system 310 directly estimates a value for the missing or unavailable glucose value 510 using the first subsequence value (and/or the first similar distribution of subsequences) and the second subsequence value (and/or the second similar distribution of subsequences).

In a second example, the similarity system 310 uses the first subsequence value (and/or the first similar distribution of subsequences) and the second subsequence value (and/or the second similar distribution of subsequences) to compute a placeholder value. In this second example, the similarity system 310 searches the database of glucose measurements 118 to identify a similar sequence using the placeholder value for the missing or unavailable glucose value 510. In some examples, the similarity system 310 also searches the database of glucose measurements 118 in iterations of searches to identify the similar subsequences and/or similar distributions of subsequences. For example, the iterations of searches are performable to identify the similar subsequences (and/or similar distributions of subsequences) with a greater accuracy such as leveraging results of a first search iteration to improve or refine a search input of a second search iteration. In other examples, the iterations of searches are performable to identify the similar subsequences (and/or similar distributions of subsequences) with a reduced computational cost such as leveraging results of the first search iteration to minimize a search space within the database of glucose measurements 118 for the second search iteration.

Consider examples in which the similarity system 310 is capable of searching the database of glucose measurements 118 in iterations to estimate missing or unavailable glucose values in the first sequence 502. In an example in which the input data 304 describes the sequence of glucose values 100 mg/dL, 101 mg/dL, XXX mg/dL, 103 mg/dL, 104 mg/dL, instead of allowing XXX to be any value (e.g., XXX is any value in a range of 40 to 400 mg/dL) such as by treating XXX as a "do not care value," the similarity system 310 is capable of searching the database of glucose measurements 118 in iterations to identify a range of values for XXX. In this example, the similarity system 310 searches the database of glucose measurements 118 in iterations that each allow XXX to be any value within different ranges of glucose values.

For example, the similarity system 310 searches the database of glucose measurements 118 to identify similar sequences to the sequence of glucose values 100 mg/dL, 101 mg/dL, XXX mg/dL, 103 mg/dL, 104 mg/dL in a first iteration in which XXX is allowed to be any value in a first range, e.g., a range of 90 to 100 mg/dL. In an example, a first most similar sequence and corresponding first similarity score (e.g., of the similarity scores 406) is determined for the first iteration. In this example, the similarity system 310 searches the database of glucose measurements 118 to identify similar sequences to the sequence of glucose values 100 mg/dL, 101 mg/dL, XXX mg/dL, 103 mg/dL, 104 mg/dL in a second iteration in which XXX is allowed to be any value in a second range, e.g., a range of 95 to 105 mg/dL. A second most similar sequence is determined for the second iteration along with a corresponding second similarity score (e.g., of the similarity scores 406).

In the previous example, if the first similarity score is greater than the second similarity score, then a value used for XXX is in a range of 90 to 94 mg/dL because the remaining values of the first range are also included in the second range. For example, if the second similarity score is greater than the first similarity score, then a value used for XXX is in a range of 101 to 105 mg/dL because the remaining values of the second range are also included in the first range. Similarly, if the first similarity score is substantially equal to the second similarity score, then a value used for XXX is in a range of 95 to 100 mg/dL because these values are included in both the first and second ranges. Accordingly, in this example, it is possible to determine one of three possible ranges that includes a value used for XXX by performing only two search iterations. It is to be appreciated that the similarity system 310 is capable of searching the database of glucose measurements 118 to identify similar sequences to the sequence of glucose values 100 mg/dL, 101 mg/dL, XXX mg/dL, 103 mg/dL, 104 mg/dL in iterations in which XXX is allowed to be any value within ranges that do not include overlapping values, XXX is allowed to be any value within ranges that include additional overlapping values, XXX is allowed to be any value within ranges that include overlapping values with some additional ranges and do not include overlapping values with other additional ranges, etc.

Although the above examples are described as searches by the similarity system 310 of the database of glucose measurements 118 in iterations that each allow XXX to be any value within different ranges of glucose values, in other examples, the similarity system 310 searches in iterations that each query a different database of glucose measurements 118 or that each query a different subset of the database of glucose measurements 118. For example, the similarity system 310 searches an initial subset of the database of glucose measurements 118 to identify similar sequences to the sequence of glucose values 100 mg/dL, 101 mg/dL, XXX mg/dL, 103 mg/dL, 104 mg/dL in an initial iteration. In this example, the initial subset of the database of glucose measurements 118 includes a relatively small number of sequences of glucose values compared to a number of sequences of glucose values included in the database of glucose measurements 118.

In one example, the similarity system 310 searches the initial subset of the database of glucose measurements 118 to identify similar sequences to the sequence of glucose values 100 mg/dL, 101 mg/dL, XXX mg/dL, 103 mg/dL, 104 mg/dL in the initial iteration where XXX is allowed to be any value (e.g., XXX is any value in a range of 40 to 400 mg/dL). Continuing this example, the similarity system 310 leverages a most similar sequence of glucose values (and/or a most similar distribution of glucose values) included in the initial subset of the database of glucose measurements 118 identified from the initial iteration to estimate a finite range for XXX (e.g., XXX is any value in a range of 50 to 200 mg/dL). The similarity system 310 searches a subsequent subset of the database of glucose measurements 118 to identify similar sequences (and/or similar distributions of sequences) to the sequence of glucose values 100 mg/dL, 101 mg/dL, XXX mg/dL, 103 mg/dL, 104 mg/dL in a subsequent iteration where XXX is allowed to be any value in the finite range.

In an example, the subsequent subset of the database of glucose measurements 118 includes a number of sequences of glucose values that is greater than a number of sequences of glucose values included in the initial subset of the database of glucose measurements 118. For example, the number of sequences of glucose values included in the subsequent subset of the database of glucose measurements 118 is less than the number of sequences of glucose values included in the database of glucose measurements 118. In one example, the similarity system 310 is capable of searching subsets of the database of glucose measurements 118 and allowing XXX to be a value in a range of glucose values in iterations such that, in relation to a previous iteration, a next iteration searches a subset of the database of glucose measurements 118 having a greater number of sequences of glucose values than a subset of the database of glucose measurements 118 searched in the previous iteration. In this example, the similarity system 310 searches a subset of the database of glucose measurements 118 in the next iteration by allowing XXX to be any value in a range of values that is narrower (includes fewer possible values of XXX) than a range of values allowed for XXX in the previous iteration.

Although the missing or unavailable glucose value 510 is illustrated as a single glucose value, it is to be appreciated that in some examples, the sequence of glucose values 506, 508, 510, 512, 514 has multiple missing or unavailable glucose values. In some examples, the multiple missing or unavailable glucose values are adjacent such as an example in which the glucose values 510, 512 are missing or unavailable. In other examples, the multiple missing or unavailable glucose values are not adjacent such as in an example in which the glucose values 510, 514 are missing or unavailable.

For the glucose values 510, 512 which are missing or unavailable and adjacent in the sequence of glucose values 506, 508, 510, 512, 514, the computing device 108 and/or the CGM system 104 implement the similarity system 310 to search the database of glucose measurements 118 to identify similar sequences (based on the similarity scores 406 and/or similarity comparisons) to an input sequence of glucose values 100 mg/dL, 101 mg/dL, XXX mg/dL, XXX mg/dL, 104 mg/dL where the missing or unavailable glucose values 510, 512 are each treated as a same "do not care" value. In an example, the similarity system 310 searches the database of glucose measurements 118 to identify similar sequences to an input sequence of glucose values 100 mg/dL, 101 mg/dL, XXX mg/dL, 104 mg/dL where the missing or unavailable glucose values 510, 512 are treated as a single "do not care" value. After identifying a most similar sequence (and/or a most similar distribution of sequences) included in the database of glucose measurements 118 where the missing or unavailable glucose values 510, 512 are treated as the same "do not care" value or the single "do not care" value, the similarity system 310 uses the identified most similar sequence (and/or the identified most similar distribution of sequences) to estimate a value for one of the missing or unavailable glucose values 510, 512. The similarity system 310 then iteratively searches the database of glucose measurements 118 using a placeholder or a "do not care" value for the other one of the missing or unavailable glucose values 510, 512.

For the glucose values 510, 514 which are missing or unavailable and are not adjacent in the sequence of glucose values 506, 508, 510, 512, 514, the computing device 108 and/or the CGM system 104 implement the similarity system 310 to search the database of glucose measurements 118 to identify similar sequences (and/or similar distributions of sequences) to an input sequence of glucose values 100 mg/dL, 101 mg/dL, XXX mg/dL, 103 mg/dL, 103 mg/dL where the missing or unavailable glucose value 510 is treated as a "do not care" value and the missing or unavailable glucose value 514 is assigned a value of an adjacent glucose value that is available in the sequence of glucose values 506, 508, 510, 512, 514. Alternatively, the similarity system 310 searches the database of glucose measurements 118 to identify similar sequences (and/or similar distributions of sequences) to an input sequence of glucose values 100 mg/dL, 101 mg/dL, 101 mg/dL, 103 mg/dL, XXX mg/dL where the missing or unavailable glucose value 514 is treated as a "do not care" value and the missing or unavailable glucose value 510 is assigned a value of an adjacent glucose value that is available in the sequence of glucose values 506, 508, 510, 512, 514. In either alternative, after identifying a similar sequence of glucose values (and/or a similar distribution of sequences of glucose values) from the database of glucose measurements 118 that is usable to estimate a value for the missing or unavailable glucose value that is treated as the "do not care" value in the search, the estimated value is used in place of the "do not care" value in an updated input sequence of glucose values described by the input data 304 that includes a "do not care" value for the missing or unavailable glucose value that was assigned the value of the adjacent glucose value that is available in the sequence of glucose values 506, 508, 510, 512, 514. For example, the similarity system 310 searches the database of glucose measurements 118 to identify similar sequences (and/or similar distributions of sequences) based on the updated input sequence of glucose values. In this example, the identified similar sequences and/or the identified similar distributions of sequences are used to estimate a value for the remaining "do not care" value.

Regardless of how the database of glucose measurements 118 is searched, the computing device 108 and/or the CGM system 104 identify a first sequence of 100 mg/dL, 101 mg/dL, 102 mg/dL, 103 mg/dL, 104 mg/dL; a second sequence of 100 mg/dL, 101 mg/dL, 103 mg/dL, 103 mg/dL, 104 mg/dL; a third sequence of 100 mg/dL, 101 mg/dL, 100 mg/dL, 103 mg/dL, 104 mg/dL; a fourth sequence of 99 mg/dL, 101 mg/dL, 102 mg/dL, 103 mg/dL, 104 mg/dL; and a fifth sequence of 99 mg/dL, 101 mg/dL, 103 mg/dL, 103 mg/dL, 106 mg/dL which are similar to glucose values 100 mg/dL, 101 mg/dL, XXX mg/dL, 103 mg/dL, 104 mg/dL. For example, the first sequence has a 25 percent frequency of occurrence in the database of glucose measurements 118; the second, third, and fourth sequences each have a 20 percent frequency of occurrence in in the database of glucose measurements 118; and the fifth sequence has a 15 percent frequency of occurrence in the database of glucose measurements 118. Accordingly, a distribution of the missing or unavailable glucose value 510 is 100 mg/dL (20 percent); 102 mg/dL (45 percent); and 103 mg/dL (35 percent) in this example.

From the distribution of the missing or unavailable glucose value 510 above, the computing device 108 and/or the CGM system 104 estimate a value of 102 mg/dL for the missing or unavailable glucose value 510 in some examples.

In other examples, a weighted average of the possible values of the distribution is used for the missing or unavailable glucose value 510. For instance, the similarity system 310 computes the weighted average by multiplying each of the possible values of the distribution by its corresponding frequency of occurrence in the distribution.

Given the distribution of the missing or unavailable glucose value 510 as 100 mg/dL (20 percent); 102 mg/dL (45 percent); and 103 mg/dL (35 percent), the similarity system 310 computes an estimated value for the missing or unavailable glucose value 510 using any aggregation function (e.g., average, median, etc.) in some examples. In an example, the similarity system 310 computes an estimated value for the missing or unavailable glucose value 510 using a Monte Carlo method. For example, the similarity system 310 draws glucose values from the distribution that have a low rate of occurrence in the distribution. For instance, there is a non-zero probability of drawing the glucose values having the low rate of occurrence in the distribution and, over enough time and samples, the drawn glucose values would match a sampling distribution of the distribution.

For example, a value estimated for the missing or unavailable glucose value 510 is different if the value is determined by the CGM system 104 than if the value is determined by the computing device 108. Consider an example in which the database of glucose measurements 118 is configured for searching using minimal computational resources for the CGM system 104. For instance, the CGM system 104 estimates missing or unavailable glucose values using a first database of glucose measurements 118 and the computing device 108 estimates missing or unavailable glucose values using a second database of glucose measurements 118.

In some examples, the first database of glucose measurements 118 includes less data than the second database of glucose measurements 118. In one example, the first database includes the person's 102 glucose measurements 118 and the second database includes the person's 102 glucose measurements 118 and the user population's 110 glucose measurements 118. In another example, the first database of glucose measurements 118 is configured to be searched using techniques which minimize computational resources consumed in the searches such as using checksums and/or hash values.

It is to be appreciated that by estimating values for missing or unavailable glucose values, the estimated values are useable in place of the missing or unavailable glucose values to facilitate a variety of additional functionality. For example, inputs to various machine learning models require complete sequences to generate meaningful and accurate outputs which is not possible if a sequence has missing or unavailable glucose values. By estimating values for the missing or unavailable glucose values to complete the incomplete sequence, the completed sequence is processable using the various machine learning models which was not possible before completing the incomplete sequence.

Although the first sequence 502 is described as the timeseries of the glucose values 506-544, it is to be appreciated that the described systems and techniques are also applicable to sequences of delta values, for example, computed from sequences of glucose values. For instance, the delta values can be computed as differences between consecutive ones of the glucose values 506-544 such that a first delta value in a sequence is equal to a difference between the glucose value 506 and the glucose value 508, a second delta value in the sequence is equal to a difference between the glucose value 508 and glucose value 510, a third delta value in the sequence is equal to a difference between the glucose value 510 and glucose value 512, and so forth. In some examples, the delta values are computed as a difference between a current glucose value and a prior glucose value in the first sequence 502 while in other examples, the delta values are computed as a difference between the prior glucose value and the current glucose value in the first sequence 502. For example, the delta values are computed as an absolute value of a difference between consecutive glucose values in the first sequence 502.

Continuing the example, the sequence of delta values is leveraged as a search input to identify a most similar sequence of delta values described by data included in corpus of delta values computed from glucose measurements 118 of the person 102 and/or of the user population 110. For example, a discrete random variable (e.g., a glucose delta variable) is utilized and a categorical distribution for the discrete random variable is generated based on observations from the corpus of delta values. A probability of observing a particular delta value given evidence or context data is determinable using the corpus of delta values. For instance, a similarity or a distance between a first delta value and a second delta value is computable as a difference between observing the first delta value given evidence or context data and a probability of observing the second delta value given the evidence or context data.

In a manner similar to the manner in which a similarity score (e.g., of the similarity scores 406) is computable for two sequences of glucose values, similarity scores are calculated for two sequences of delta values by determining differences between a probability of observing each delta value of one of the sequences given evidence or context data and a probability of observing each delta value of the other one of the sequences given the evidence or context data. For example, a similarity score for the two sequences of delta values is equal to a sum of the determined differences. Accordingly, the sequence of delta values is a search input for searching the corpus of delta values to identify a most similar sequence of delta values (e.g., a sequence of delta values having a highest similarity score) to the sequence of delta values.

In some examples, similarities between sequences of delta values may be leveraged in addition to similarities between sequences of glucose values. In other examples, similarities between sequences of delta values may be leveraged as an alternative to similarities between sequences of glucose values. For example, similarities between sequences of delta values may be leverageable in relation to generating alarms and/or alerts for the person 102 such as to avoid generating an alert for a sequence of delta values that is determined to be similar an additional sequence of delta values that caused generation of a nuisance alert for the person 102. In an example, sequences of delta values are used to obfuscate the actual glucose measurements 118 of the person 102 and/or the user population 110. For instance, the sequences of delta values are used as the synthetic glucose measurements or the sequences of delta values are used instead of the synthetic glucose measurements to identify similar sequences of glucose values.

Figure 6:
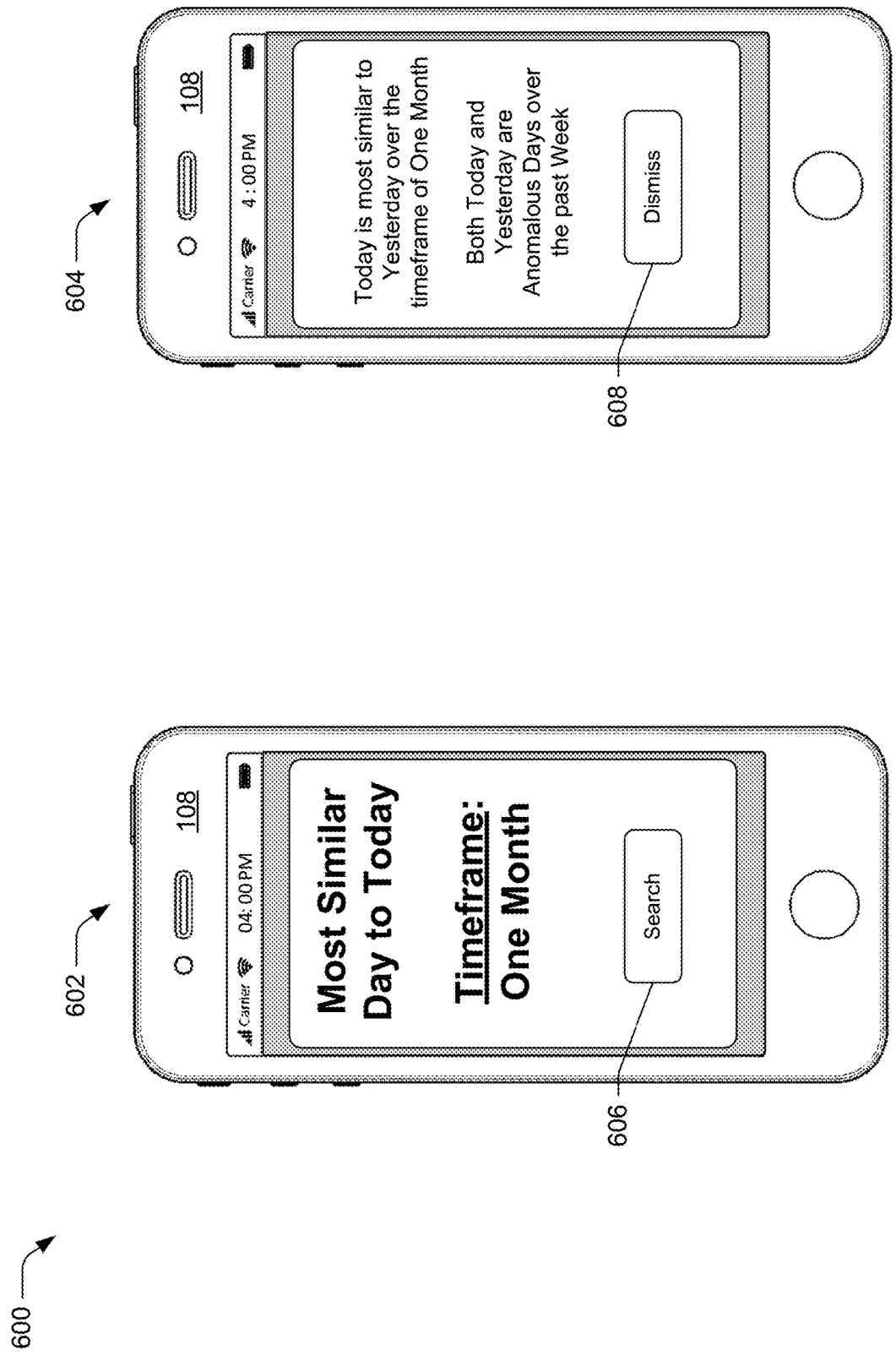
FIG. 6 illustrates a representation of a search request based on a sequence of user glucose values and an indication of a similar sequence of glucose values.

FIG. 6 illustrates a representation 600 of a search request based on a sequence of user glucose values and an indication of a similar sequence of glucose values. The representation 600 includes a query example 602 and a response example 604. In the query example 602, the person 102 interacts with the computing device 108 to specify a query and a timeframe. As shown, the query is "most similar day to today" and the timeframe is "one month."

The person 102 interacts with user interface element 606 to perform the search. The similarity system 310 receives the input data 304 which describes the person's 102 query and the similarity system 310 assigns the person's 102 sequence of glucose values to be the sequence of user glucose values 306. The similarity system 310 then uses the similarity model to identify a particular sequence of glucose values described by the sequence data 308 which has a highest similarity score (e.g., of the similarity scores 406) for the sequence of user glucose values 306 within a most recent month.

The similarity system 310 generates the similar sequence data 312 as describing the particular sequence and also determines an externality associated with the particular sequence. In one example, the particular sequence includes metadata describing the externality and the similarity system 310 determines the externality by processing this metadata. As shown in the response example 604, the computing device 108 receives the similar sequence data 312 and the indication 314 of the externality and displays an indication of the particular sequence and the indication 314 of the externality.

The indication of the particular sequence is "today is most similar to yesterday over the time frame of one month." The indication 314 of the externality is "both today and yesterday are anomalous days over the past week." The user interacts with a user interface element 608 to dismiss the displayed indications.

Consider another example in which the person 102 interacts with the computing device 108 to specify a query and a timeframe as in the previous example. However, in this example, the person's 102 sequence of glucose values has missing or unavailable glucose values. Because of these missing or unavailable glucose values in the person's 102 sequence of glucose values, it is not possible for the similarity system 310 to identify the particular sequence of glucose values described by the sequence data 308 which has the highest similarity score for the sequence of user glucose values 306 within the most recent month. For example, the similarity system 310 is not able to process the input data 304 if the input data 304 describes a sequence of glucose values that has a missing or unavailable glucose value. In one example, the similarity system 310 is unable to process the input data 304 if the input data 304 describes a sequence of glucose values that is missing a glucose value between two available glucose values in the sequence. Since the particular sequence of glucose values is not identifiable, the computing device 108 is unable to display the indication 314 of the externality.

Continuing this example, before identifying the particular sequence of glucose values described by the sequence data 308, the computing device 108 and/or the CGM system 104 can implement the similarity system 310 to search the database of glucose measurements 118 to identify a most similar sequence of glucose values to the person's 102 sequence of glucose values using a "do not care" value or a placeholder value for the missing or unavailable glucose values in the person's 102 sequence of glucose values. The similarity system 310 identifies a specific sequence of glucose values as the most similar sequence which is different than the particular sequence. The computing device 108 and/or the CGM system 104 use the specific sequence of glucose values to estimate the missing or unavailable glucose values in the person's 102 sequence of glucose values.

For example, the similarity system 310 receives the input data 304 which describes the person's 102 query, and the similarity system 310 assigns the person's 102 sequence of glucose values (including estimated values for the missing or unavailable glucose values) to be the sequence of user glucose values 306. The similarity system 310 then uses the similarity model to identify the particular sequence of glucose values described by the sequence data 308 which has the highest similarity score for the sequence of user glucose values 306 within the most recent month or designated period of time. The similarity system 310 determines the externality by processing the metadata included in the particular sequence that describes the externality and, the computing device 108 displays the indication 314 of the externality as "both today and yesterday are anomalous days over the past week."

Figure 7:
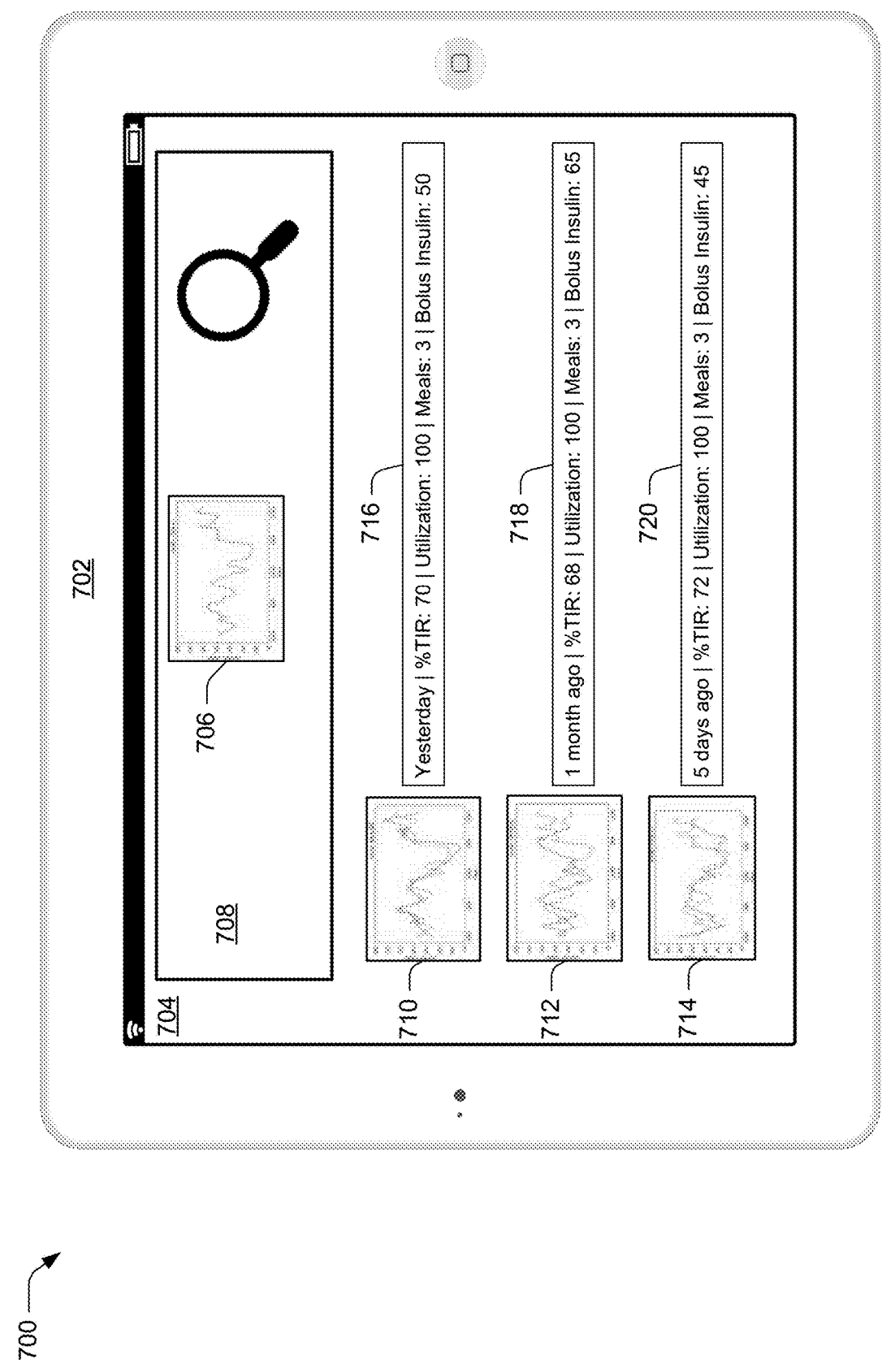
FIG. 7 illustrates a representation of a user interface that receives at least one sequence of glucose values for use as a search query and outputs one or more similar sequences of glucose values determined as search results to the search query.

FIG. 7 illustrates a representation 700 of a user interface that receives at least one sequence of glucose values for use as a search query and outputs one or more similar sequences of glucose values determined as search results to the search query. The representation 700 includes a computing device 702, and a user such as the person 102 or a member of the user population 110 interacts with an input device (e.g., a stylus, a mouse, a touchscreen, a keyboard, etc.) relative to a user interface 704 of the computing device 702 to search for sequences of glucose values that are similar to today's glucose values 706. For example, the user interacts with the input device relative to the user interface 704 to input today's glucose values 706 in a search field 708 displayed in the user interface 704. As shown, today's glucose values 706 is a sequence of glucose values based on the glucose measurements 118 of the person 102 from 12:00 AM at the beginning of today to 12:00 AM at the end of today. Although described as today's glucose values 706, it is to be understood that any sequence of glucose values can be used in place of or in addition to today's glucose values 706. Examples of sequences of glucose values that are usable in place of or in addition to today's glucose values 706 include glucose values of a different day, glucose values of multiple different days, an hour of glucose values, multiple hours of glucose values, a minute of glucose values, multiple minutes of glucose values, and so on.

In one example, the computing device 702 includes the similarity system 310 and the storage device 120, and the similarity system 310 receives today's glucose values 706 based on today's glucose values 706 being input to the search field 708. In another example, the computing device 702 does not include the similarity system 310. In this example, the computing device 702 is connected to the network 116 and the computing device 702 communicates today's glucose values 706 to the similarity system 310 via the network 116 based on today's glucose values 706 being input to the search field 708. Continuing this example, the similarity system 310 receives today's glucose values 706 as the sequence of user glucose values 306.

For example, the similarity system 310 processes the sequence of user glucose values 306 to identify similar sequences 710-714 of glucose values to today's glucose values 706. As shown, indications of the similar sequences 710-714 are displayed in the user interface 704. In the example in which the computing device 702 includes the similarity system 310, the computing device 702 receives data describing the similar sequences 710-714 directly from the similarity system 310. In the example in which the computing device 702 does not include the similarity system 310, the computing device 702 receives data describing the similar sequences 710-714 from the similarity system 310 via the network 116.

For instance, the similar sequences 710-714 are displayed in the user interface 704 based on how similar each of the similar sequences 710-714 is relative to today's glucose values 706. In an example, today's glucose values 706 are maximally similar to today's glucose values 706 (e.g., a sequence of glucose values is maximally similar with itself). Today's glucose values 706 are illustrated to have a similarity score of 283.0 with today's glucose values 706. Accordingly, in this example a similarity score of 283.0 is a highest possible similarity score for two sequences of glucose values. In other examples, a highest possible similarity score for two sequences of glucose values is greater than 283.0 or less than 283.0.

In one example, similar sequence 710 is a most similar sequence to today's glucose values 706 of the similar sequences 710-714; similar sequence 712 is less similar to today's glucose values 706 than the similar sequence 710; and similar sequence 714 is less similar to today's glucose values 706 than the similar sequence 712. In an example, the similarity system 310 determines a relative similarity of the similar sequences 710-714 to today's glucose values 706 based on the similarity scores 406. In this example, the similar sequence 710 has a similarity score of 48.1168 with today's glucose values 706, the similar sequence 712 has a similarity score of 26.5652 with today's glucose values 706, and the similar sequence 714 has a similarity score of 37.9157 with today's glucose values 706. Accordingly, in this example, the similar sequences 710-714 are not displayed in order of similarity in the user interface 704 because the similar sequence 714 has a higher similarity score with today's glucose values 706 than the similar sequence 712.

Consider an example in which the similarity system 310 does not identify the similar sequences 710-714 using the similarity scores 406 or only partially uses the similarity scores 406 to identify the similar sequences 710-714. For example, the similarity system 310 identifies the similar sequences 710-714 at least partially based on other data. Examples of data which may be included in the other data are displayed in the user interface 704 as indications 716-720. Indication 716 corresponds to the similar sequence 710 and the indication 716 identifies a day as "Yesterday" as a time period when the glucose measurements 118 of the person 102 were recorded as the similar sequence 710. The indication 716 also identifies a time in range of 70 percent, 100 percent utilization, 3 meals consumed, and bolus insulin of 50.

Indication 718 corresponds to the similar sequence 712 and the indication 718 identifies a day as "1 month ago" as a time period when the glucose measurements 118 of the person 102 were recorded as the similar sequence 712. The indication 718 also identifies a time in range of 68 percent, 100 percent utilization, 3 meals consumed, and bolus insulin of 65. For instance, indication 720 correspond to the similar sequence 714, and the indication 720 identifies a day as "5 days ago" as a time period when the glucose measurements 118 of the person 102 were recorded as the similar sequence 714. The indication 720 also identifies a time in range of 72 percent, 100 percent utilization, 3 meals consumed, and bolus insulin of 45.

In one example, even though the similar sequence 714 has a higher similarity score with today's glucose values 706 than the similar sequence 712, the similarity system 310 displays the similar sequence 712 before the similar sequence 714 in the user interface 704 as being more similar to today's glucose values 706 than the similar sequence 714 based on a similarity comparison. In this example, the similarity system 310 identifies that today's time in range is 68 percent which is the same time in range as the day "1 month ago." Based on this similarity comparison, the similarity system 310 causes the similar sequence 712 to be displayed in the user interface 704 before the similar sequence 714. In another example, the similarity system 310 identifies that today's bolus insulin is 65 which is the same bolus insulin as the day "1 month ago." Based on this similarity comparison in this other example, the similarity system 310 causes the similar sequence 712 to be displayed in the user interface 704 before the similar sequence 714.

Figure 8:
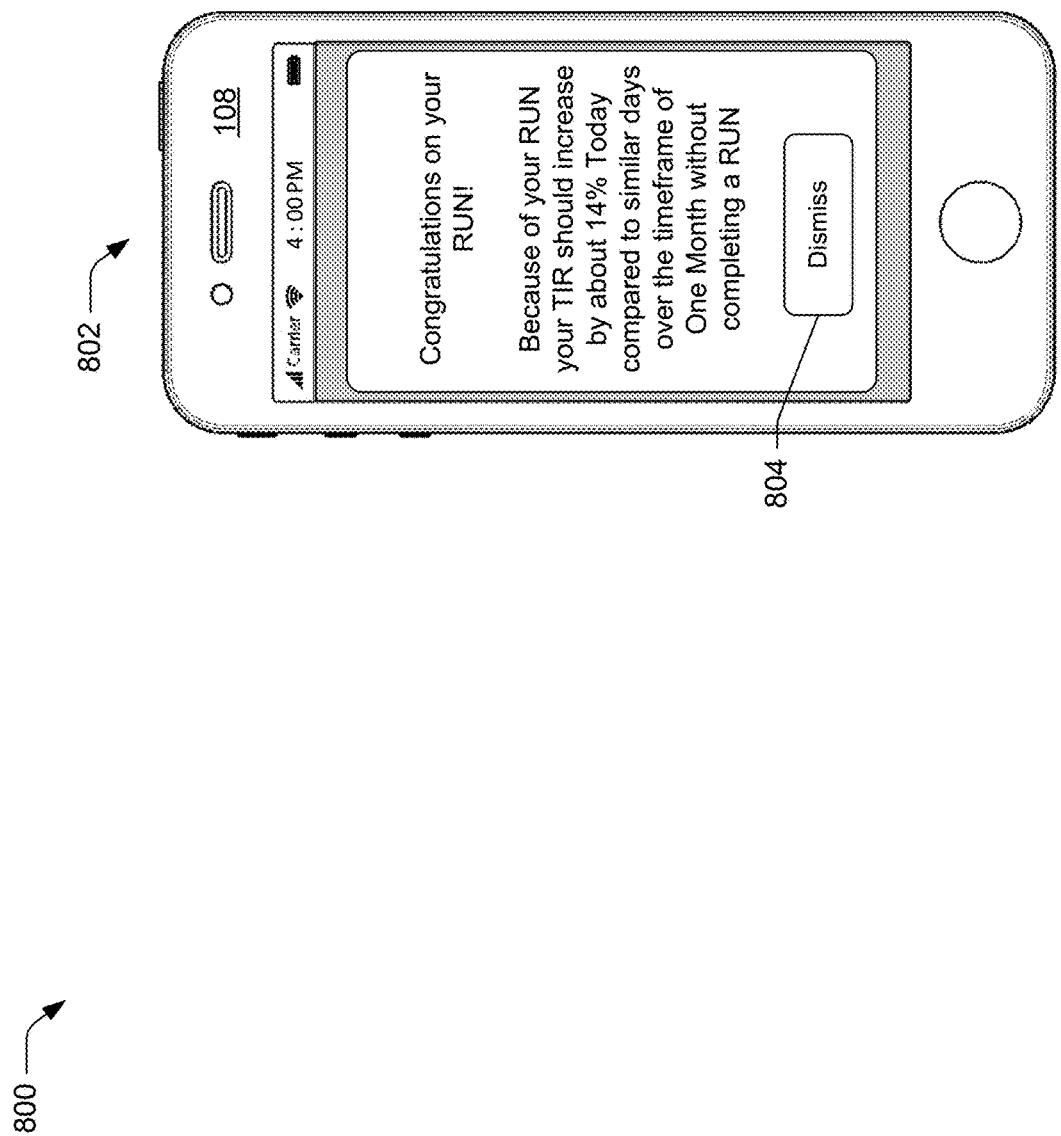
FIG. 8 illustrates a representation of an indication of an externality including a counterfactual indication.

FIG. 8 illustrates a representation 800 of an indication of an externality including a counterfactual indication. As shown, the computing device 108 determines that the person 102 has gone for a run, and the computing device 108 communicates the person's 102 most recent sequence of glucose values to the similarity system 310. For example, the person 102 interacts with a user interface of the computing device 108 to indicate information about the person's 102 run such as a total distance traversed during the run, the person's 102 heartrate during the run, calories burned during the run, etc. In one example, the computing device 108 receives data describing the person's 102 run from another computing device such as a smart watch. The similarity system 310 identifies the run from time stamps included in the sequence of user glucose values 306 and extracts a subsequence of glucose values just before the run. The similarity system 310 identifies a subsequence of glucose values described by the sequence data 308 that is similar to the extracted subsequence of glucose values.

The similarity system 310 then determines that the identified subsequence is included in sequence of glucose values described by the sequence data 308 corresponding to a day when the person 102 did not go for a run. The similarity system 310 generates the similar sequence data 312 and the indication 314 and the computing device 108 receives the similar sequence data 312 and the indication 314. The computing device 108 displays a counterfactual indication which is "because of your run your TIR should increase by about 14% today compared to similar days over the timeframe of one month without completing a run." For example, the person 102 interacts with a user interface element 804 to dismiss the counterfactual indication.

Example Procedures

Figure 9:
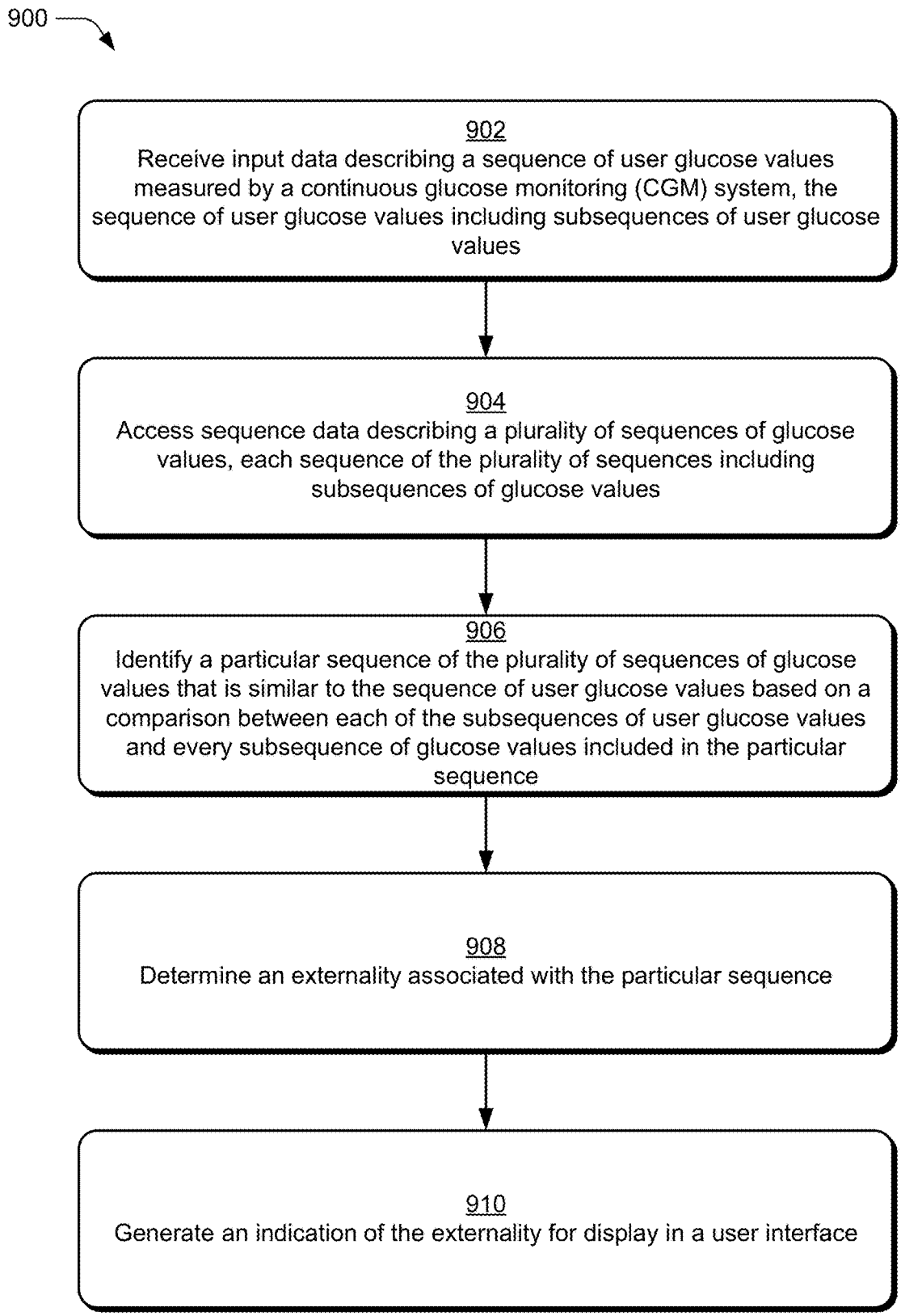
FIG. 9 is a flow diagram depicting a procedure in an example implementation in which input data describing a sequence of user glucose values is received and an indication of an externality associated with a similar sequence of glucose values is generated.

This section describes example procedures for determining similarity of sequences of glucose values. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. FIG. 9 is a flow diagram depicting a procedure 900 in an example implementation in which input data describing a sequence of user glucose values is received and an indication of an externality associated with a similar sequence of glucose values is generated. Input data is received describing a sequence of user glucose values measured by a continuous glucose monitoring (GCM) system, the sequence of user glucose values includes subsequences of user glucose values (block 902). For example, the similarity system 310 receives the input data. Sequence data is accessed that describes a plurality of sequences of glucose values, each sequence of the plurality of sequences including subsequences of glucose values (block 904). In one example, the similarity system 310 accesses the sequence data.

A particular sequence of the plurality of sequences of glucose values is identified that is similar to the sequence of user glucose values based on a comparison between each of the subsequences of user glucose values and every subsequence of glucose values included in the particular sequence (block 906). In an example, the similarity system 310 identifies the particular sequence. An externality is determined that is associated with the particular sequence (block 908). For example, the similarity system 310 determines the externality. An indication of the externality is generated for display in a user interface (block 910). In one example, the similarity system 310 generates the indication of the externality.

Figure 10:
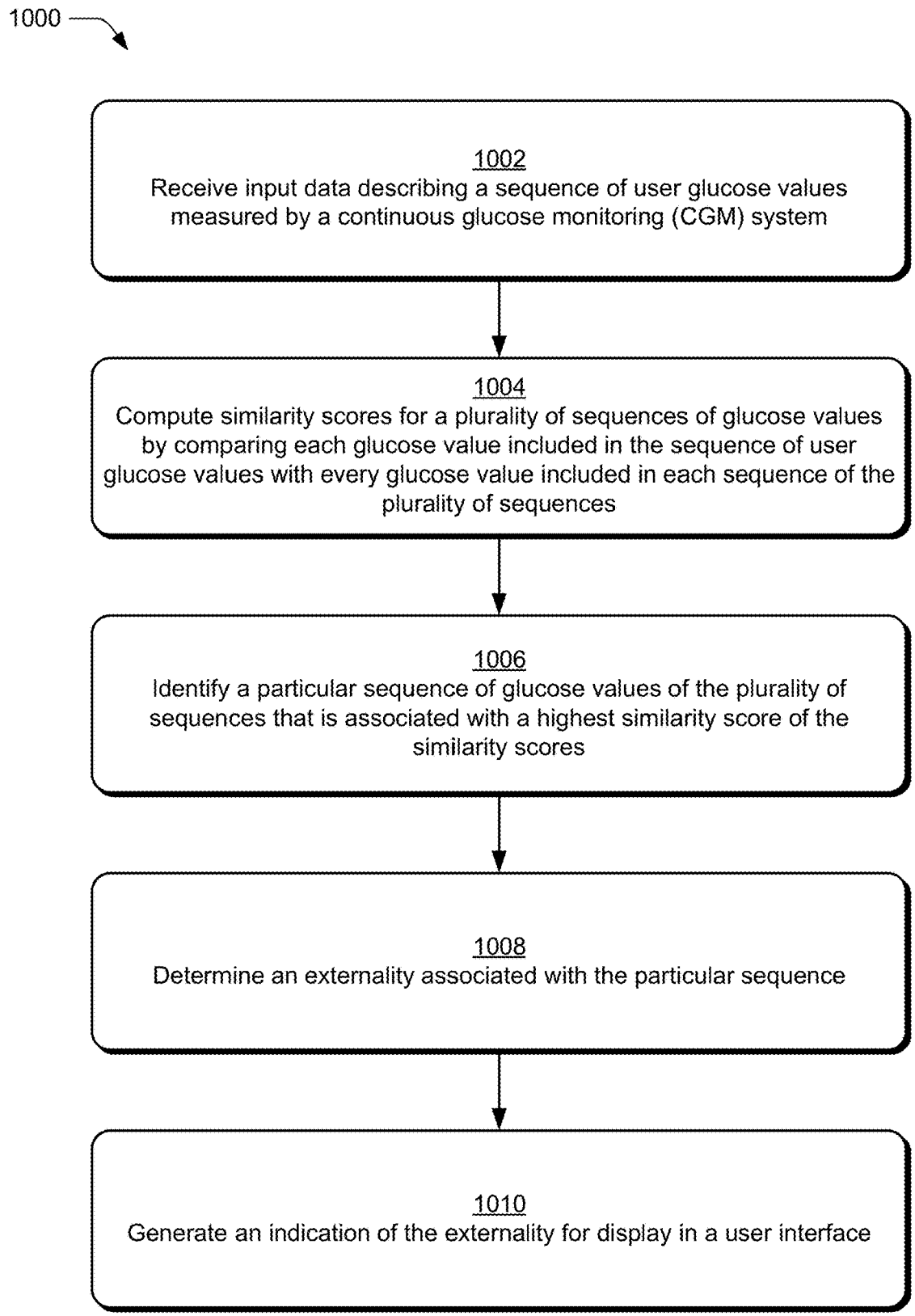
FIG. 10 is a flow diagram depicting a procedure in an example implementation in which input data describing a sequence of user glucose values is received and an indication of an externality associated with a sequence of glucose values having a highest similarity score is generated.

FIG. 10 is a flow diagram depicting a procedure 1000 in an example implementation in which input data describing a sequence of user glucose values is received and an indication of an externality associated with a sequence of glucose values having a highest similarity score is generated. Input data is received describing a sequence of user glucose values measured by a continuous glucose monitoring (CGM) system (block 1002). In one example, the similarity system 310 receives the input data. Similarity scores are computed for a plurality of sequences of glucose values by comparing each glucose value included in the sequence of user glucose values with every glucose value included in each sequence of the plurality of sequences (block 1004). For example, the similarity system 310 computes the similarity scores.

A particular sequence of glucose values of the plurality of sequences is identified that is associated with a highest similarity score of the similarity scores (block 1006). In one example, the similarity system 310 identifies the particular sequence as being associated with the highest similarity score. An externality is determined that is associated with the particular sequence (block 1008). For example, the similarity system 310 determines the externality. An indication of the externality is generated for display in a user interface (block 1010). In an example, the similarity system 310 generates the indication of the externality.

Figure 11:
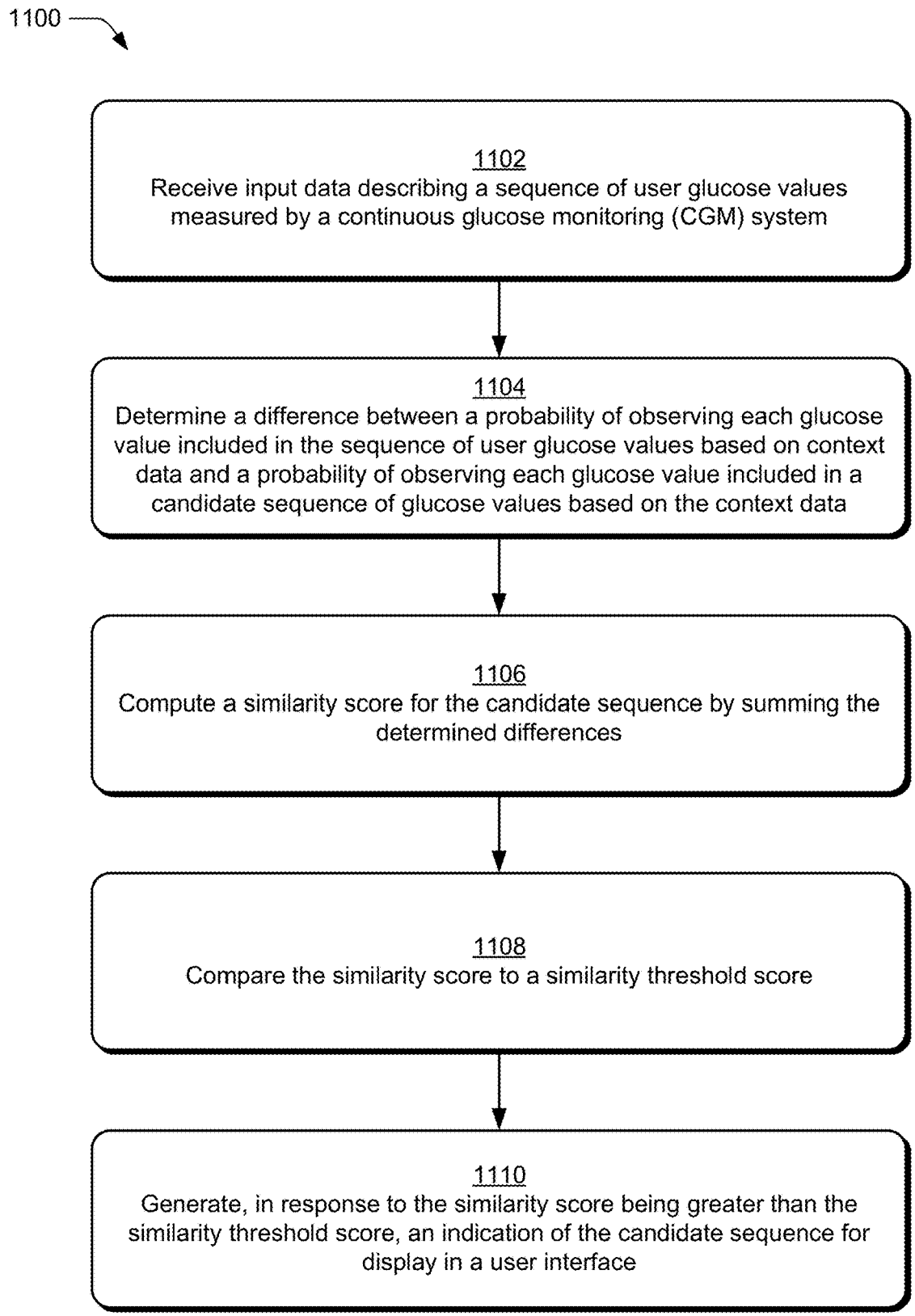
FIG. 11 is a flow diagram depicting a procedure in an example implementation in which a similarity score for a candidate sequence is determined and compared to a similarity threshold score.

FIG. 11 is a flow diagram depicting a procedure 1100 in an example implementation in which a similarity score for a candidate sequence is determined and compared to a similarity threshold score. Input data is received describing a sequence of user glucose values measured by a continuous glucose monitoring (CGM) system (block 1102). For example, the similarity system 310 receives the input data. A difference is determined between a probability of observing each glucose value included in the sequence of user glucose values based on context data and a probability of observing each glucose value included in a candidate sequence of glucose values based on the context data (block 1104). In an example, the similarity system 310 determines the differences.

A similarity score is computed for the candidate sequence by summing the determined differences (block 1106). The similarity system 310 computes the similarity score in one example. The similarity score is compared to a similarity threshold score (block 1108). For example, the similarity system 310 compares the similarity score to the similarity threshold score. An indication of the candidate sequence is generated for display in a user interface in response to the similarity score being greater than the similarity threshold score (block 1110). In one example, the similarity system 310 generates the indication of the candidate sequence.

Example System and Device

Figure 12:
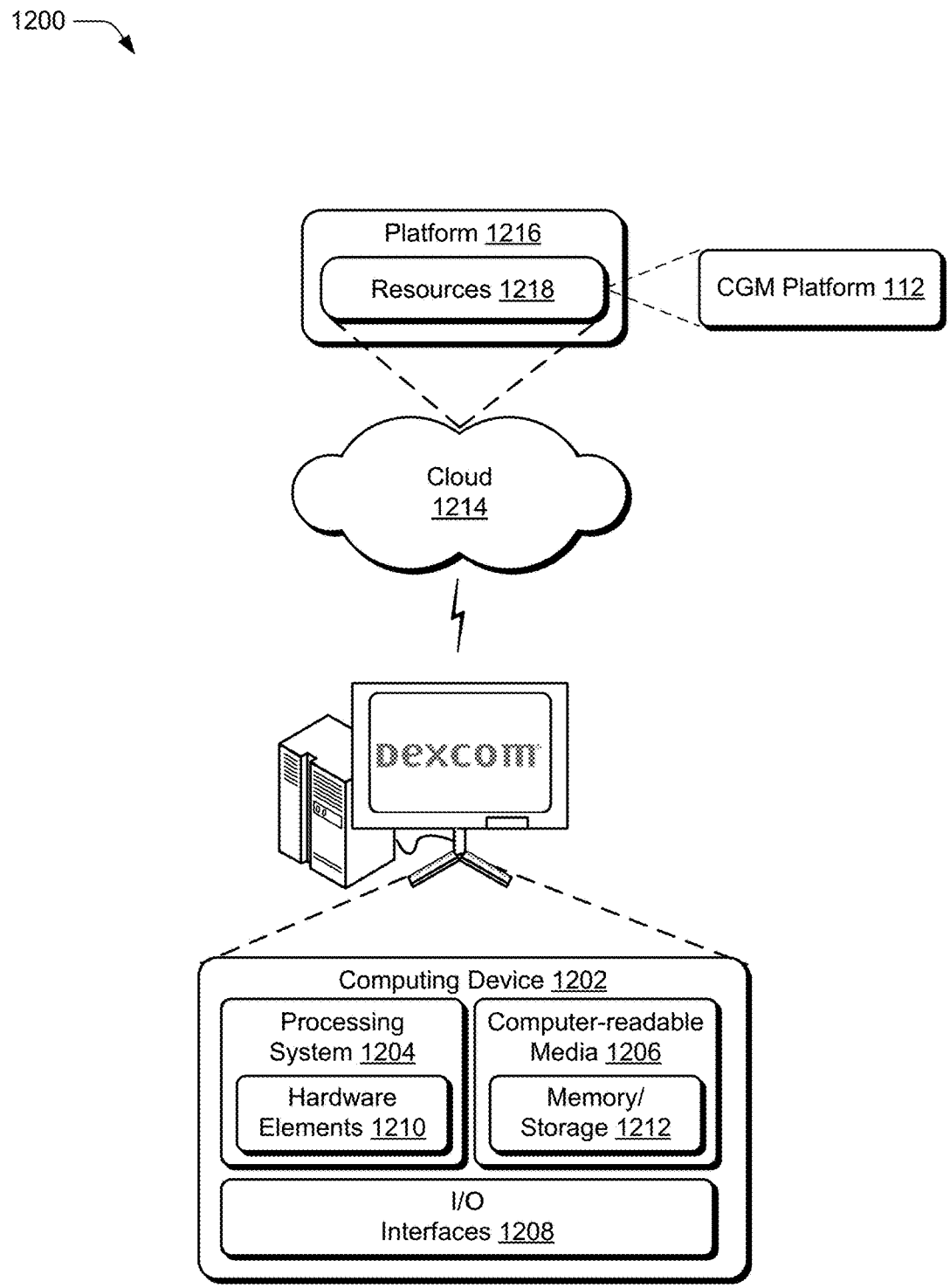
FIG. 12 illustrates an example system that includes an example computing device that is representative of one or more computing systems and/or devices that may implement the various techniques described herein.

FIG. 12 illustrates an example system generally at 1200 that includes an example computing device 1202 that is representative of one or more computing systems and/or devices that may implement the various techniques described herein. This is illustrated through inclusion of the CGM platform 112. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application-specific integrated circuit or other logic device formed using one or more semiconductors. The hardware elements 1210 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, combinations thereof, and so forth) as well as removable media (e.g., Flash memory, a removable hard drive, an optical disc, combinations thereof, and so forth). The computer-readable media 1206 may be configured in a variety of other manners, as described in further detail below.

Input/output interface(s) 1208 are representative of functionality to enable a user to enter commands and/or information to computing device 1202, and to enable information to be presented to the user and/or other components or devices using various input/output devices. Examples of input devices include a keyboard, a cursor control device (e.g., a mouse), a microphone, a scanner, touch functionality (e.g., capacitive or other sensors configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, program modules include routines, programs, objects, elements, components, data structures, and so forth that perform particular tasks or implement particular abstract data types. The terms "module," "functionality," and "component" as used herein generally represent software, firmware, hardware, or combinations thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described herein.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method implemented by a computing device, the method comprising:
receiving input data describing a sequence of user glucose values measured by a continuous glucose monitoring (CGM) system, the sequence of user glucose values including subsequences of user glucose values;
accessing sequence data describing a plurality of sequences of glucose values, each sequence of the plurality of sequences including subsequences of glucose values;
identifying a particular sequence of the plurality of sequences of glucose values that is similar to the sequence of user glucose values based on a comparison between each of the subsequences of user glucose values and every subsequence of glucose values included in the particular sequence, wherein the comparison includes determining a difference between a probability of observing a first glucose value included in a subsequence of user glucose values based on context data and a probability of observing a second glucose value included in a subsequence of glucose values included in the particular sequence based on the context data;
determining an externality associated with the particular sequence; and
generating an indication of the externality for display in a user interface.

2. The method as described in claim 1, wherein the externality is described by metadata associated with the particular sequence.

3. The method as described in claim 1, wherein the externality is an adverse event that is likely to occur if an intervention is not conducted and wherein the indication of the externality includes an indication of the intervention.

4. The method as described in claim 1, wherein the externality is an adverse event that was likely to occur if the sequence of user glucose values is not similar to the particular sequence.

5. The method as described in claim 4, wherein the indication of the externality includes a counterfactual indication.

6. The method as described in claim 1, wherein the sequence of user glucose values is associated with a particular user and the plurality of sequences of glucose values are associated with the particular user.

7. The method as described in claim 1, wherein the sequence of user glucose values is associated with a particular user and the plurality of sequences of glucose values are associated with a different user.

8. The method as described in claim 7, wherein the plurality of sequences of glucose values are associated with multiple different users.

9. The method as described in claim 1, wherein the context data describes a glucose value before or after the first glucose value in the one subsequence of user glucose values.

10. The method as described in claim 1, wherein the context data describes a glucose value before or after the second glucose value in the one subsequence of glucose values.

11. A method implemented by a computing device, the method comprising:
receiving input data describing a sequence of user glucose values measured by a continuous glucose monitoring (CGM) system;
computing similarity scores for a plurality of sequences of glucose values by comparing each glucose value included in the sequence of user glucose values with every glucose value included in each sequence of the plurality of sequences, wherein the comparing includes determining a difference between a probability of observing a first glucose value included in the sequence of user glucose values based on context data and a probability of observing a second glucose value included in the particular sequence based on the context data;

identifying a particular sequence of glucose values of the plurality of sequences that is associated with a highest similarity score of the similarity scores;

determining an externality associated with the particular sequence; and generating an indication of the externality for display in a user interface.

12. The method as described in claim 11, wherein the sequence of user glucose values is associated with a particular user and the plurality of sequences of glucose values are associated with the particular user.

13. The method as described in claim 11, wherein the sequence of user glucose values is associated with a particular user and the plurality of sequences of glucose values are associated with multiple different users.

14. The method as described in claim 11, wherein the context data describes a glucose value before or after the first glucose value in the sequence of user glucose values.

15. The method as described in claim 11, wherein the context data describes a glucose value before or after the second glucose value in the particular sequence.

16. A method implemented by a computing device, the method comprising:

receiving input data describing a sequence of user glucose values measured by a continuous glucose monitoring (CGM) system;

determining a difference between a probability of observing each glucose value included in the sequence of user glucose values based on context data and a probability of observing each glucose value included in a candidate sequence of glucose values based on the context data;

computing a similarity score for the candidate sequence by summing the determined differences;

comparing the similarity score to a similarity threshold score; and generating, in response to the similarity score being greater than the similarity threshold score, an indication of the candidate sequence for display in a user interface.

17. The method as described in claim 16, further comprising:

determining an externality associated with the candidate sequence; and generating an indication of the externality for display in the user interface.

18. The method as described in claim 17, wherein the indication of the externality includes a counterfactual indication.

* * * * *